March 7, 1967  A. BROTHMAN ETAL  3,308,238
CREDIT CHECK SYSTEM HAVING COMPARISON OF TRANSMITTED DATA
Filed Nov. 20, 1962  9 Sheets-Sheet 2
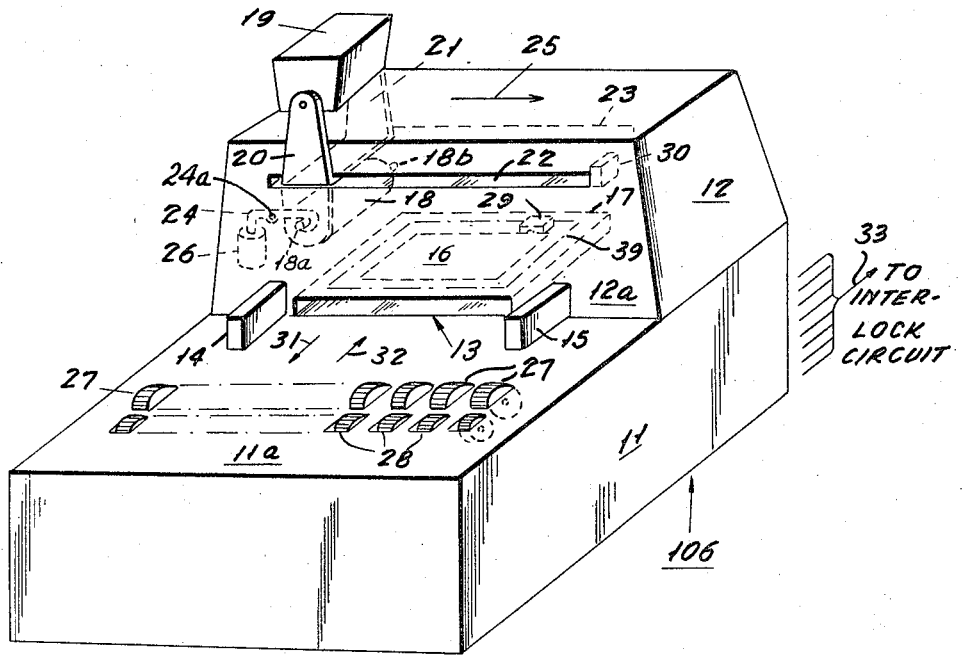
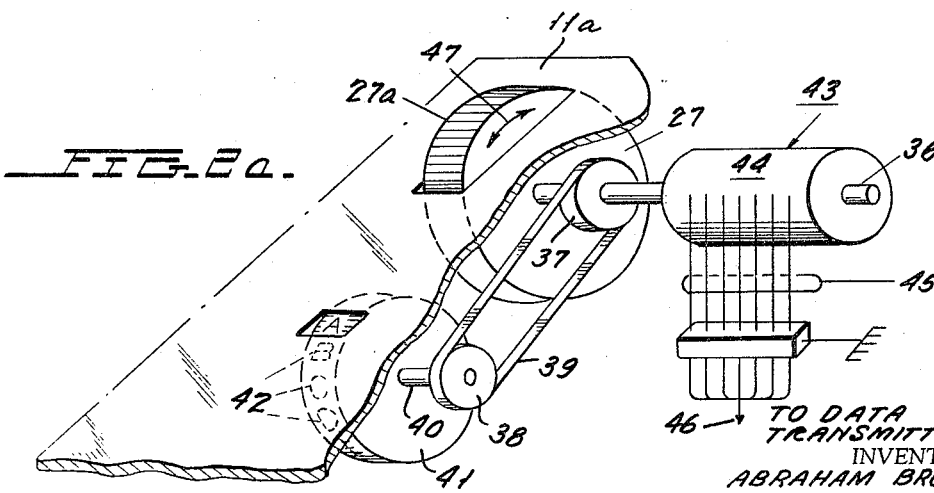
INVENTORS
ABRAHAM BROTHMAN
RICHARD D. REISER
BY
OSTROLENK, FABER, GERB & SOFFEN
ATTORNEYS

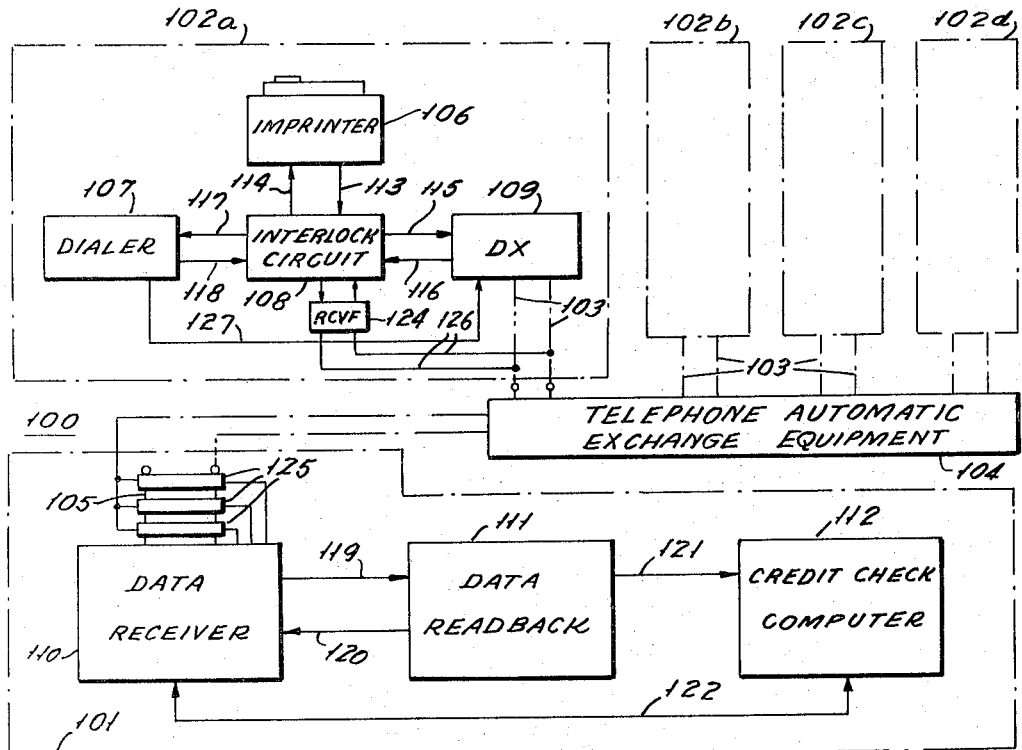
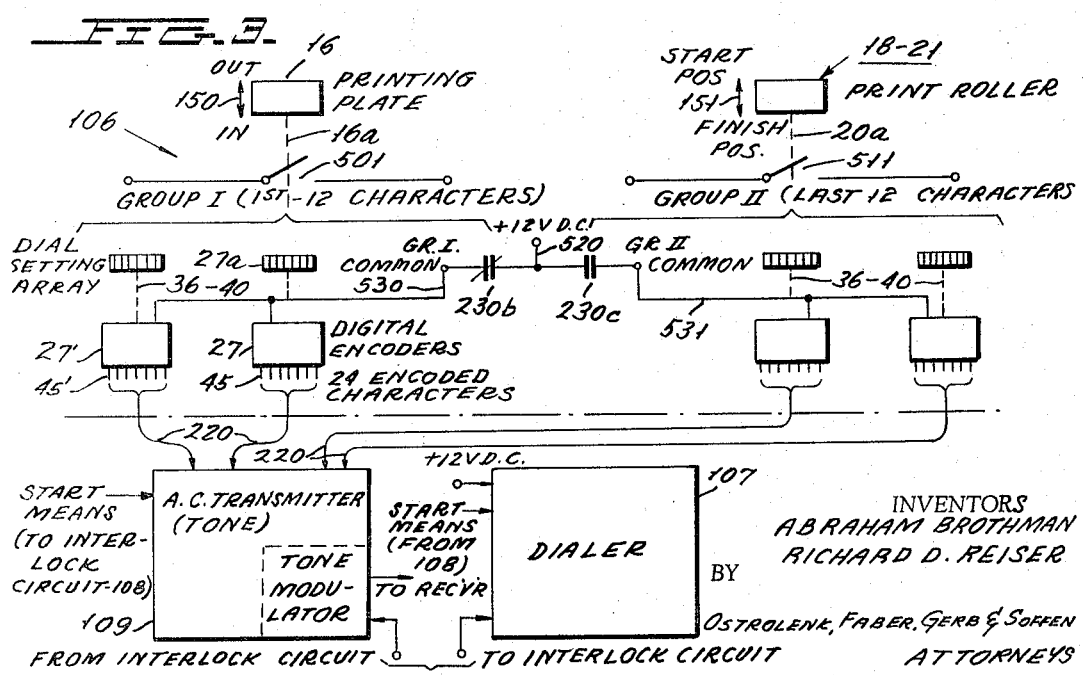

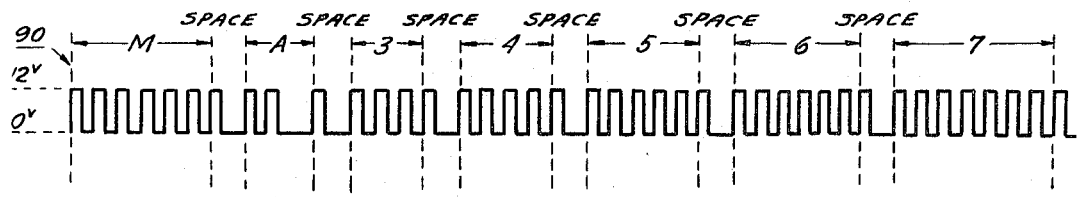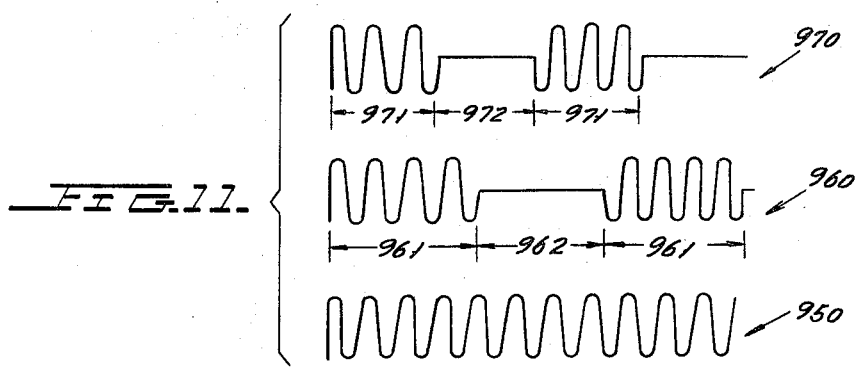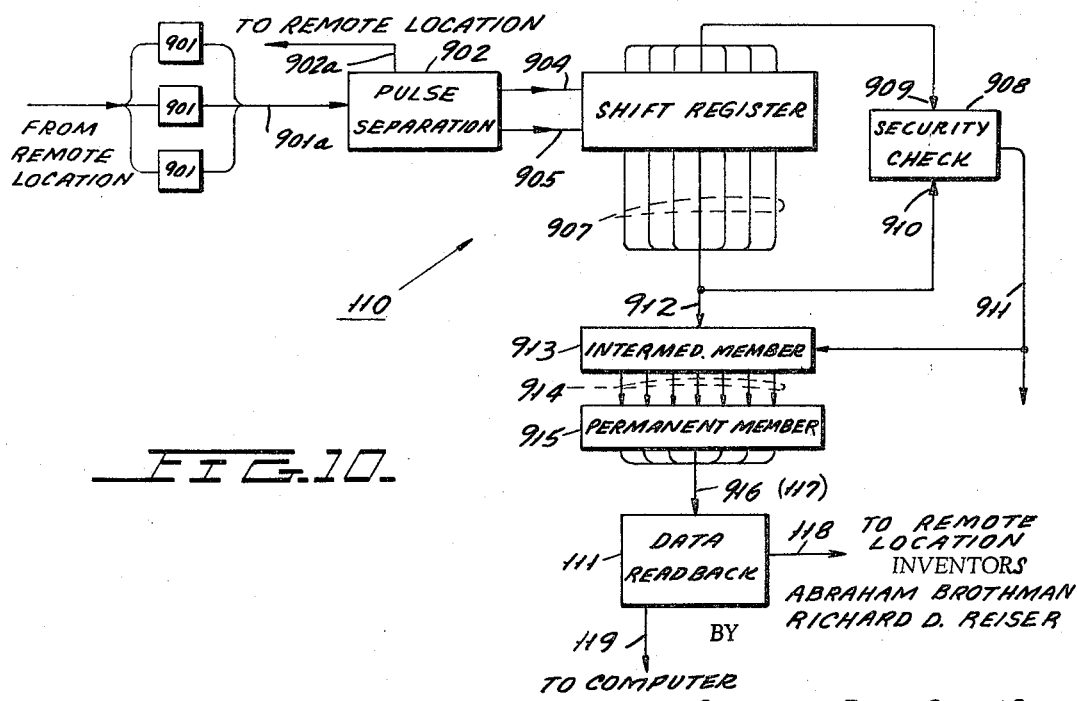

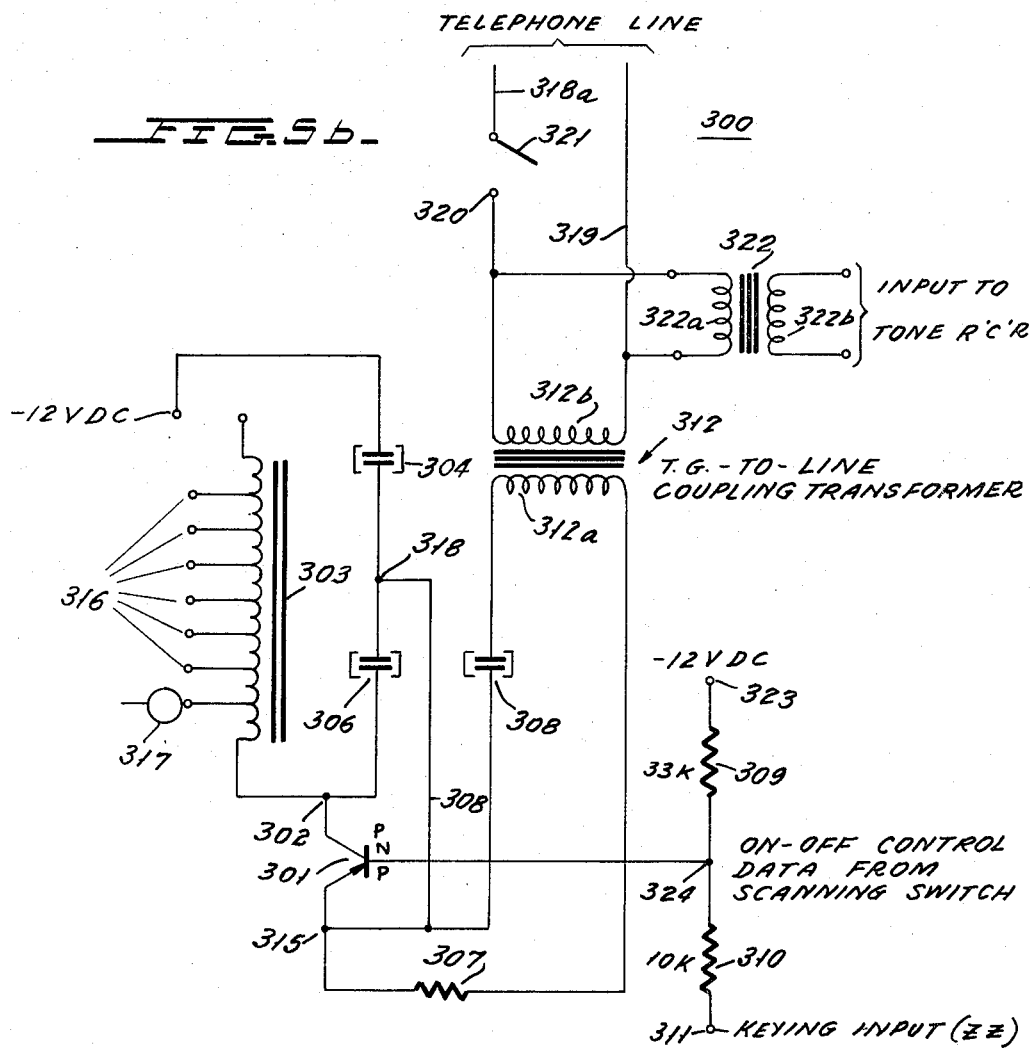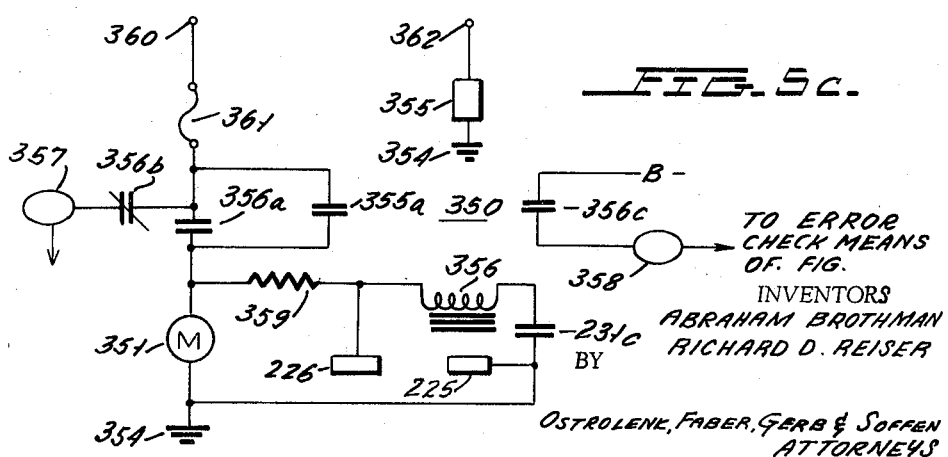

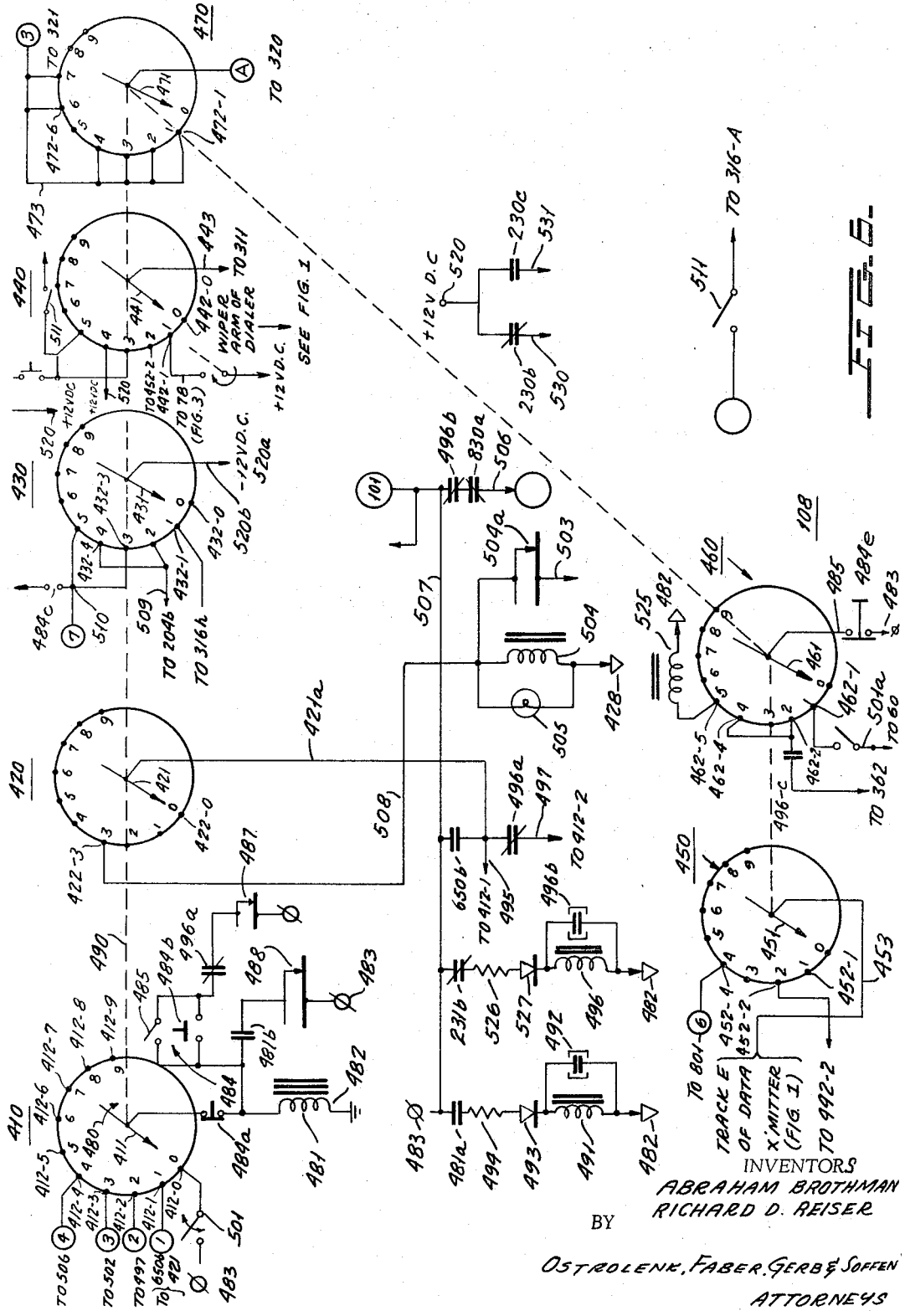

March 7, 1967 A. BROTHMAN ETAL 3,308,238
CREDIT CHECK SYSTEM HAVING COMPARISON OF TRANSMITTED DATA
Filed Nov. 20, 1962 9 Sheets-Sheet 8
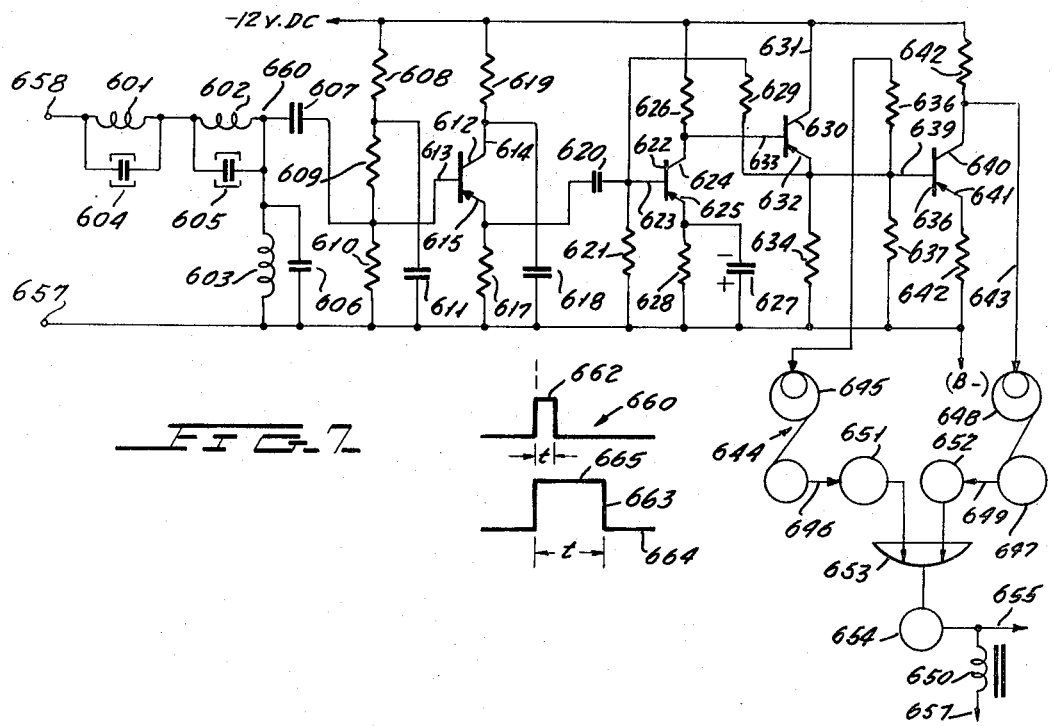
FIG. 7.
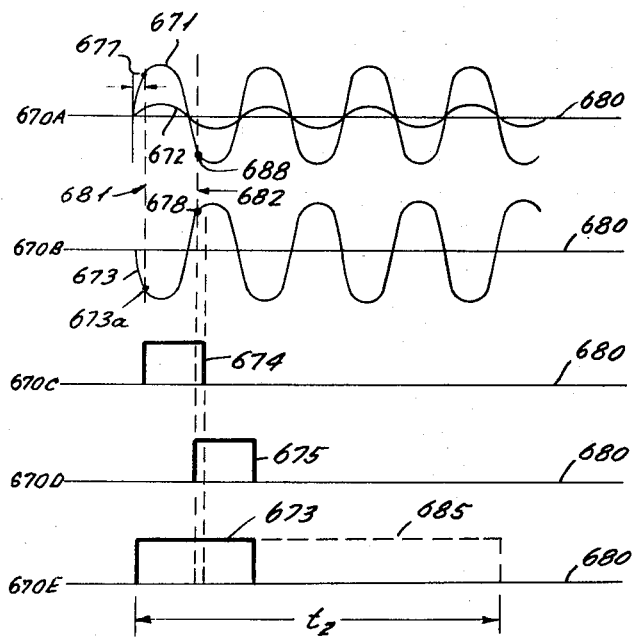
FIG. 8.
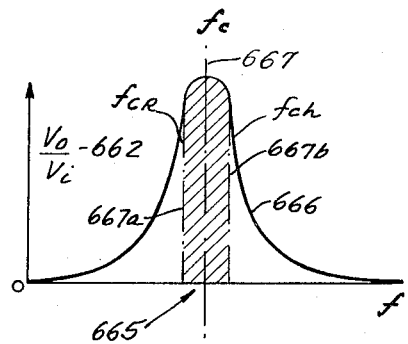
INVENTORS
ABRAHAM BROTHMAN
RICHARD D. REISER
BY
OSTROLENK, FABER, GERB & SOFFEN
ATTORNEYS

3,308,238
CREDIT CHECK SYSTEM HAVING COMPARISON OF TRANSMITTED DATA
Abraham Brothman, Dumont, and Richard D. Reiser, Waldwick, N.J., assignors to Transitel International Corporation, Paramus, N.J., a corporation of New Jersey
Filed Nov. 20, 1962, Ser. No. 238,952
12 Claims. (Cl. 179—2)

This application relates to a communications system, and more particularly to a communications system comprising a central location and a plurality of remote or branch locations wherein the transfer of intelligence between remote locations and the central location is a completely automatic operation from initiation to termination of the communication loop.

A wide variety of communications systems are presently being used for the transfer of data from one remote location to another. One of the most widespread systems presently in use is that of transfer of data in the audio or speech range by means of telephone networks. Although such systems are reliable with respect to establishing the communication loop, the disadvantages of such a system are the extremely low speeds at which transfer of speech intelligence takes place, and the human error involved in reception and reproduction of the intelligence being transmitted. The availability of telephone networks is advantageous, however, due to their extremely large size and coverage, which enables remote locations to communicate with one another without the necessity for sophisticated transmission and reception equipment on the part of the parties desiring to establish a communication loop therebetween.

The desirable approach, therefore, is that of coupling, with the telephone network as the communication medium, transmission and reception equipment to replace the audio transceivers presently employed in order to increase transmission speeds substantially and to avoid completely any possibility of human error in the communication of intelligence. The instant invention is a communications system which is so designed as to automate the entire communications cycle from the initiation of the attempt to establish a communications link to the termination of the communications link upon the requisite transfer of intelligence.

The communications system of the instant application is comprised of a mechanically operable storage means which is employed for the purpose of setting up the data to be transferred from a remote location to a central office. When the intelligence to be transmitted is set up in the storage means, a communication link initiating means or start means is then operated for the purpose of energizing an automatic dialing facility. The automatic dialing facility employed is of the type described in U.S. application Serial No. 126,278 now U.S. Patent No. 3,219,758 entitled "Data Transmitter" filed July 24, 1961 by A. Brothman et al. and assigned to the assignee of the instant invention. The data transmitter is so arranged as to have the call letter code of the central location permanently stored therein. The dialing facility, upon energization, electro-mechanically performs the dialing function which is manually performed by the telephone handsets presently in use. However, the dialing operation as performed electro-mechanically is substantially more reliable than the manual dialing operation known to the prior art.

Upon establishment of the communications link between the remote location and the central location, the automatic dialing facility is deenergized. However, if the communication link is not established, the automatic dialing operation will be repeated again and again until it is successful in establishing the communication link or until the automatic dialing facility is manually deenergized, or upon loss of link continuity, assuming the remote location no longer desires to communicate with the central location at this time.

A data receiver mechanism located at the central location is so arranged as to become energized upon establishment of the communications link between central and remote locations and to send an acknowledgment signal to the remote location through the telephone network in order to acknowledge establishment of the communication link. The acknowledgment signal is picked up at the remote location by a tone receiver mechanism which is responsive to a specified tone frequency which is designated as the acknowledgment signal and which tone receiver is adapted to deenergize the automatic dialing facility and to simultaneously initiate the data transmission cycle.

The data transmission sequence is performed by an electro-mechanical programming means, which interlocks the transmitter, receiver and storage units at the remote location in order to control the energization of these units at the appropriate time in the transmission cycle. The electro-mechanical programming unit is comprised of a multi-deck stepping switch wherein each deck includes a rotary arm and an associated bank of contacts with which the rotary arm is sequentially engageable. The rotary arms of each deck are controlled by a common shaft and are in angular alignment so that all arms experience the same amount of rotation and assume the same angular position throughout the transmission cycle.

The communication link acknowledgment signal causes the electro-mechanical programming unit to step to a first position wherein the circuitry associated with the rotary switch first position of each deck is arranged to initiate the transmission cycle. A tone transmitter means is employed for the actual transmission of data from remote to central locations and is of the type set forth in U.S. application No. 162,337, now Patent No. 3,196,213 entitled "Multiple Tone Transmitter," filed December 27, 1961 by A. Brothman et al. and assigned to the asignee of the instant invention. The tone transmitter is designed to transmit data which has been encoded into binary form. The binary-coded data is transmitted by amplitude modulating a carrier frequency, so that the presence of a frequency represents a first binary state and the absence of that frequency represents the opposite binary state. Multiple tones are employed in the tone transmitter for the purpose of synchronization, so that each binary bit of information is retained in its proper weighted position within the binary coded word, thus significantly reducing the possibility of an error during data transmission through the employment of an extremely low-cost synchronizing circuit arrangement.

The manually settable storage means which is set up prior to the attempt at initiating the communication link is comprised of a plurality of rotatable members which are capable of assuming a number of discrete angular positions. Each rotatable member is mechanically coupled to a shaft angle encoder for the purpose of encoding the discrete angular positions into their binary-coded representations. The shaft angle encoder employed is of the type set forth in U.S. application Ser. No. 125,247, now Patent No. 3,165,733, entitled, "Code Stack," filed July 19, 1961 by A. Brothman et al. and assigned to the assignee of the instant invention. The output terminals of each of the shaft angle encoders are in communication with circularly aligned conductive segments of the tone transmitter, which segments are sequentially engaged by the tone transmitter rotary sensing arm for transmission through the telephone lines.

The transmitted data is received at the central location by tone receiver means, the output of which is adapted to impress the data received upon a data storage and readback facility operatively associated with the central location data receiver. The data receiver employed is of the type set forth in U.S. application, Ser. No. 241,917, entitled, "Data Receiver," filed December 3, 1962 by A. Brothman et al. and assigned to the assignee of the instant invention. The data receiver described therein is so designed as to receive the data transmitted through the telephone network and perform four levels of validity checks upon the data prior to storage of the data in the data storage and readback means.

A computer is provided at the central location for receiving the data read into the storage and read-back facility in order to generate the correct response to the data intelligence received at the central location. The response is transmitted from central location to remote location where it is received by a tone receiver means which is tuned to the frequency of the response signal and which is adapted to appropraitely energize the electro-mechanical programming means according to the consistency of the received tone wherein a first condition of the received signal is adapted to terminate the communication link at this instant and wherein a second condition of the response signal is employed to energize the electro-mechanical programming means to continue the program due to the nature of the response received. The second type of signal which causes the program cycle to continue from this point is adapted to drive the electro-mechanical programming means into the next program step which constitutes a bit-by-bit comparison check between the data transmitted to the central location which was impressed upon the storage and read-back facility which is compared against the data transmitted at the central location.

Upon successful completion of the bit-by-bit data comparison operation, the start button which initiated the communication link cycle is thereby released for subsequently establishing further communication links at any later time. The communications system set forth above is readily applicable for use as a credit check system which is subsequently set forth herein as a preferred embodiment of the system. The credit check system adaptation is provided for by designing the initiation or start button of the communications system as an imprinter means which is adapted to receive portable printing plates distributed to charge customers by retail establishments, gasoline filling stations, hotels, nationwide credit card organizations and the like. The imprinter means, upon insertion of the portable printing plate, is arranged so that its manually adjustable input members are positioned in accordance with the data to be transmitted, such as, for example, the customer identification number, the retail store identification number, and the cash amount of the potential purchase to be made. The start button which energizes the automatic dialer for the purpose of initiating a communication loop between remote and central location may now be depressed. In addition to energizing the automatic dialer, the start button locks the manually movable rotating members so that they may not be tampered with during the communications cycle.

The advantages of piggy backing such a credit checking system upon presently existing telephone lines are such that the nature of the telephone network enables the employment of transmission reception equipment which is far less expensive than that equipment which is employed for wireless communication. The scope of such a system is vast since existing telephone lines include not only large cities, but even remote rural areas throughout the land, which is extremely advantageous for performing a credit-checking function on a nation-wide scale.

The operation of the communication system as a credit-checking system is briefly as follows:

The seller (i.e., the retail establishment), upon approval of the goods being offered for sale by the potential customer, receives the portable charge plate which the potential customer possesses and places it in the imprinter means. The merchant's identification number, the potential customer's card identification number and the amount of the potential purchase are then set into the manually operable rotary members. Each rotary member is mechanically associated with a separate dial and cooperating window which exposes the alpha numeric character to which the rotatable member is set, thus providing the merchant with a visual representation of the characters which he has set into the imprinter storage means.

The merchant then begins the automatically programmed communications cycle by pressing a start button which, as recited previously, locks the rotatable members until termination of the communications cycle and energizes the automatic dialer.

The electro-mechanical programming means, in response to the depression of the start button, is the mechanism which energizes the automatic dialer. The automatic dialer electronically dials the central location which, if not busy, apprises the remote location (i.e., the location of the retail store) of the fact that a communications link has been established. A tone receiver means which is adapted to respond to the specified tone which designates establishment of a communication link, drives the electro-mechanical programmer into the next step of the program.

The next step of the program is that of transmitting the data set into the manually operable storage means, which is first encoded by the shaft angle encoders prior to transmission. The data which has then been encoded to a binary form is transmitted by the data transmitter to the central location through the medium of the telephone network. The data, upon receipt by the central location data receiver, performs all security checks upon the data and, upon satisfaction of all security measures, transmits a signal to the remote location (i.e., the retail establishment) which apprises the remote location of successful completion of the transmission. A computer is provided at the central location for the purpose of performing the credit check. The potential customer's identification number is employed as the address which the computer uses to locate the customer's records within the computer "memory." The customer's credit status is then compared against the amount of the purchase which the customer desires to make in order to ascertain whether ot not the credit should be approved by the retail establishment. If the credit purchase is approved, a signal is transmitted to the remote location through the telephone network media and is received by a tone receiver which is adapted, upon receipt of a predetermined tone frequency, to step the electro-mechanical programming means to the next programming step.

The next programming step consists of a comparison of the data stored in the manually operable storage means at the remote location with the data that was transmitted to the central office, the comparison being made at the remote location by an error comparing means. If the comparison remains correct throughout all the characters, the error-checking circuit at the remote location drives the electro-mechanical programming means to the next program step. If the comparison circuit shows that an error has been committed, in transmission and/or reception, the data stored in the remote location manually operable storage means is re-transmitted to the central location at which time a second comparison check will be performed.

If, however, the comparison checks out favorably, the next program step above-recited causes the output signal of the comparison or error-checking circuit to release the imprinter roller so that a sales slip which is a written record of the transaction may be imprinted with the customer's name, address and credit identification number which is contained on the portable printing plate carried by the customer and which is normally in the form of raised lettering to facilitate the preparation of the printed sales slip. It should be noted that the print roller is unlatched for the performance of the printing operation only after the central location approves the purchase, thus preventing the retail establishment from making a sale on credit without approval of the central location. The print roller, in moving from its initial position across the printing plate so that the sales slip is sandwiched between the print roller and the printing plate, actuates a limit switch at the end of its travel which serves to energize the electro-mechanical programming means for the final program step which is that of sending a pre-determined tone frequency to the central location, which tone apprises the central location that the purchase on credit has been completed so that the purchase may now be added to the customer's existing credit records at the central location computer.

A cancel push-button arrangement is provided on the imprinter, which enables the retailer to interrupt the communications link between remote and central locations. If, for example, the customer changes his mind and decides not to make the purchase, depression of the "cancel push-button" arrangement transmtis a frequency to the central location which apprises the central location of cancellation of the proposed transaction and simultaneously resets the electro-mechanical programming means back to its initial starting position in readiness for subsequent transactions. The limit switch which is operated by the print roller when it reaches the end of its travel is likewise adapted to perform the function of resetting the electro-mechanical programming means to its initial starting position in readiness for subsequent transactions but, as should be understood, does not transmit a signal to the central location of the frequency of that transmitted by the cancelled transaction operation. Interrupter contact means are provided in the electro-mechanical programming means for deenergizing the programming means when the starting position is reached so that the communication system will not continue operation beyond completion of the communication cycle.

The tone receivers employed at the remote and central locations are so designed as to generate a square wave output having a pulse width which is substantially equal to the elapsed time of the predetermined tone frequency impressed upon its input. A tuned circuit is provided at the tone receiver input which attenuates all frequencies on both sides of the predetermined frequency to which the circuit is tuned so that no output (i.e., a zero level output) appears at the tone receiver output terminals. The output waveform is generated by a unique arrangement which is comprised of first and second amplifier means connected to the tuned circuit output which amplifiers produce waveforms at their outputs which are 180° out of phase with one another. Each output waveform is impressed upon an associated monostable circuit means which is driven to a set state by the appropriate level of input signal impressed upon its input terminals and which monostable means resets itself a predetermined time period after impression of the input signal upon its input terminal. The predetermined time period is chosen so that it is approximately 60% of the cycle of the input tone frequency. The outputs of the first and second monostable circuit means are combined in an OR circuit arrangement, the output of which is employed to drive an energizing means, such as a relay coil. Since each monostable circuit remains in its set state for a period which is approximately 60% of the input tone cycle, the set states of the monostable devices combine and merge in the logical OR circuit into a single square pulse output. The set states continue to merge until the termination or removal of the specified input tone frequency from the tone receiver. The width of the resultant square pulse is substantially equal to the time period which the signal is present at the tone receiver input.

It is, therefore, one object of this invention to provide a communication system having novel electro-mechanical programming means which is so designed as to automate the entire communications cycle.

Another object of this invention is to provide a communications system which is designed to be fully automatic in operation and which employs the telephone network as the communication medium.

Another object of this invention is to provide a communications system adaptable for use as a credit checking network which is so designed as to automatically transmit data dealing with the potential purchase to a central location and to promptly receive the proper response therefrom in order to enable the merchant to complete the potential transaction.

Another object of this invention is to provide a communications system which is designed for use as a credit check network which includes an imprinter apparatus for producing a paper transaction of the sale wherein the imprinter mechanism is mechanically restrained from operation pending the appropriate response from the central location.

Still another object of this invention is to provide a communications system which is readily adaptable for use as a credit-checking network which employs a novel tone receiver circuit for demodulating a specified frequency.

Another object of this invention is to provide a communications system which is adaptable for use as a credit checking network having means for interrupting the pre-programmed communications cycle at any time for the purpose of cancelling the intended purchase.

Another object of this invention is to provide a communications system which employs telephone lines as the communication medium wherein the system includes novel means for automatically dialing a central location wherein the dialing cycle is repetitive until a communications link is established between calling and called locations.

Another object of this invention is to provide a communications system readily adaptable for use as a credit checking network which is so designed as to automatically carry out a predetermined communications program upon the initiation of the imprinter start button which is arranged to simultaneously initiate the predetermined program and to lock in the information to be transferred from the remote to the central location in order to prevent tampering with the data to be transferred during the transmission thereof.

Still another object of this invention is to provide a communications system which is designed for use as a credit checking network wherein a central location storage and computer arrangement is provided for the permanent recording therein of the data transferred in order to keep a centralized record of all transactions which have occurred within the network.

These and other objects will become apparent from the following description and drawings wherein:

FIGURE 1 is a block diagram of the communications system.

FIGURE 2 is a perspective view of the imprinter shown in FIGURE 1.

FIGURE 2a is a perspective view of one of the shaft encoders of FIGURE 2.

FIGURE 3 is a schematic diagram showing the imprinter mechanism, multiple tone transmitter and data transmitter of FIGURE 1.

FIGURE 4a shows the waveform generated by the dialer of FIGURE 4.

FIGURES 5a, 5b and 5c show the data transmitter of FIGURES 1 and 3 in greater detail.

FIGURE 6 is a schematic diagram of the electro-mechanical interlock circuit shown in block diagram form in FIGURE 1.

FIGURE 7 is a schematic diagram of the tone receiver employed at both remote and central locations in the communications system of FIGURE 4.

FIGURE 8 shows a group of waveforms for use in describing the operation of the tone receiver of FIGURE 7.

FIGURE 9a is a logical type schematic diagram of an error checking circuit employed at the receiver location of the communications system of FIGURE 1.

FIGURES 9b and 9c show other preferred embodiments of the error check circuit of FIGURE 9a.

FIGURE 10 shows the data receiving equipment of FIGURE 1 in diagrammatical from.

FIGURE 11 shows the waveforms transmitted from central location to remote locations shown in FIGURE 1.

Figure 4:
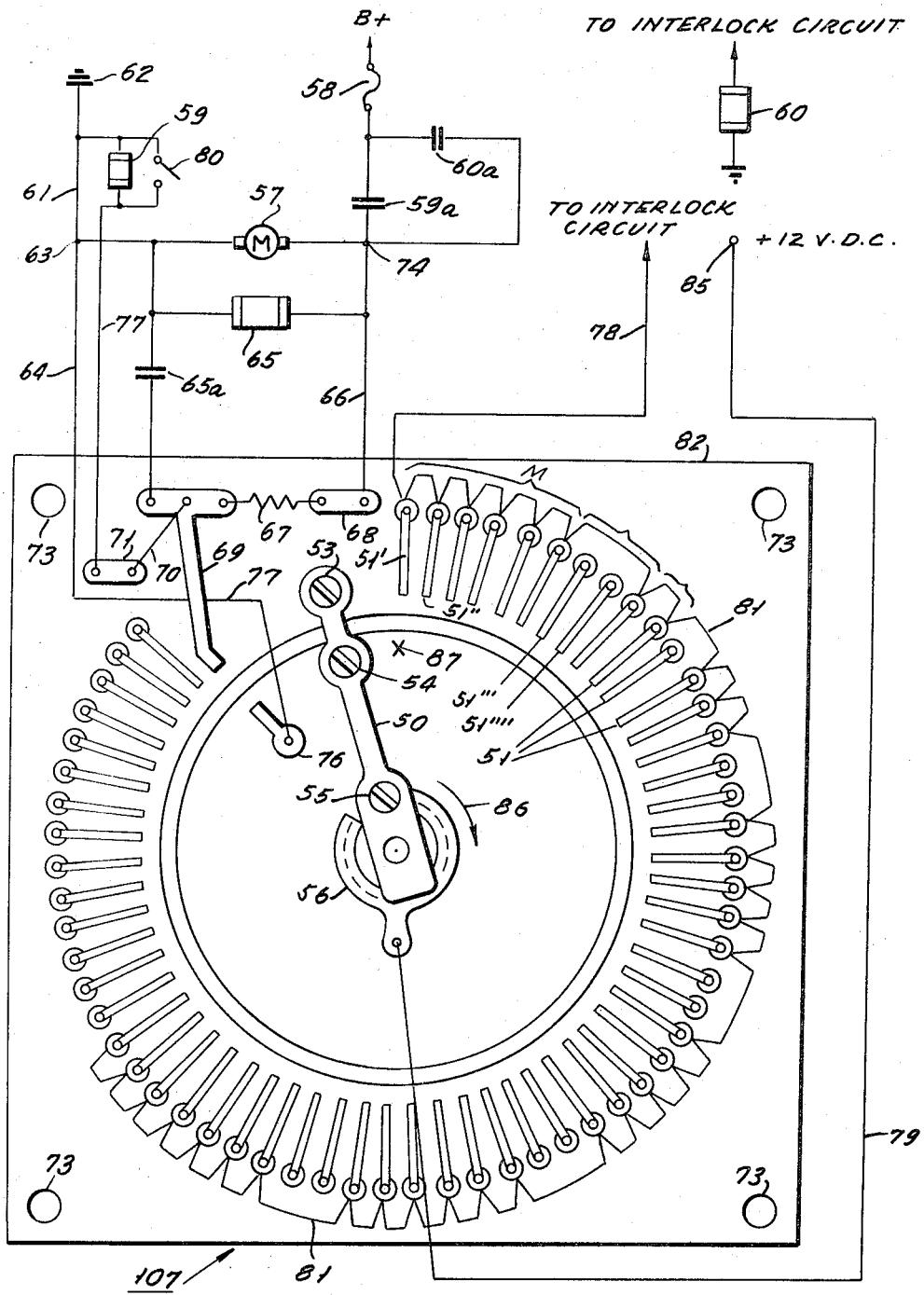
FIGURE 4 is a schematic diagram showing the dialer mechanism of FIGURES 1 and 3 in greater detail.

Referring now to the drawings:

*System*

FIGURE 1 shows a preferred embodiment of the communications system 100, which is comprised of a central location 101 and a plurality of remote locations 102a through 102d. It should be understood that each one of the remote locations 102a through 102d contain like components and only one such remote location will be fully explained for the purpose of brevity. Each remote location may establish a communication link with the central location 101 by means of the telephone lines 103 associated therewith, which lines connect through the telephone automatic exchange equipment designated diagrammatically as 104 and on through the subscriber lines 105 of the central location 101. The telephone automatic exchange equipment 104 may be any type of line-locating equipment which is presently in use and plays no part in the novelty and uniqueness of the instant invention. Although FIGURE 1 shows the remote locations 102a through 102d as being connected to the same central exchange 104, it should be understood that, as with regular telephone service, the subscriber locations may first establish contact with a central exchange remote from that which is directly connected to the central location equipment 101 shown in FIGURE 1 from which point it may ultimately make contact with the central exchange 104 and, therefore, it should be understood that the arrangement of FIGURE 1 has been employed for the purpose of simplicity, and not to limit the system to applicaitons wherein only subscribers connect with one telephone central exchange office may utilize such a system.

Each remote location, such as the remote location 102a shown in FIGURE 1, is comprised of an imprinter 106 which is employed to initiate the communications cycle by means of receiving a portable printing plate and by depressing the impirnter start button (not shown in FIGURE 1), as will be more fully described.

The imprinter mechanism 106 is linked to an interlock circuit 108 which controls and synchronizes the operation of all components located at the remote location 102a.

The interlock circuit 108 of each remote location 102a through 102d is electrically linked with the communication facilities at the remote location 102A, which connections are shown by lead lines 113 through 118, 126 and 127. The interlock circuit serves as the sequencing or programming means for the communications cycle, thereby automating the entire operation and, further, enabling the operation to take place at substantially high speeds. One type of programming means which may be utilized is a stepping switch arrangement having a plurality of banks of contacts wherein the individual contacts of each bank are sequentially engaged by a rotary stepping arm. The advancement of the stepping arm to the next angular position causes the circuitry connected thereto to be actuated and/or deactuated, thus providing for the program sequencing of operations, as will be more fully described. It should be understood that other types of programming means may be used, such as for example, a magnetic or electronic shift register arranged to operate as a ring counter wherein the advancement to each succeeding stage of the conductive state of the ring counter is employed as the initiating means for energizing and/or deenergizing the circuit associated therewith.

A dialer means 107 is employed at the remote location 102a for the purpose of automatically dialing the central location 101 call code for the purpose of establishing a communication link between remote and central locations 102a and 101 respectively. The dialer mechanism 107, the operation of which is sequenced by the interlock or programming circuit 108, is employed to electronically generate the remote location call letter code, and upon acknowledgement of establishment of a communication link, to be deenergized under control of the interlocking circuit 108. If, however, the communication link fails to be established due to utilization of all circuits which the central location 101 has with other remote locations, the dialer 107 continues to electronically generate the central location call letter code until the communication link is established, or until the attempt to establish the communication link by the central location 102a is terminated by a cancelling operation, which circuitry will be more fully described.

A data transmitter 109 is employed at the remote location 102a for the purpose of generating the signals which are to be carried by the telephone lines 103 and 105 for receipt by the central location 101. The data transmitter 109 is of the type described in aforementioned U.S. application Serial No. 162,337, now Patent No. 3,196,213. The tone generator of the aforementioned application consists basically of two sub-combinations, namely, the rotary switch arrangement and the tone generator. The rotary switch arrangement is employed to sequence the encoded data stored in the imprinter mechanism 106 via the interlock circuit 108 for the purpose of impressing the encoded binary bits upon the inputs of the tone generator assembly. The tone generator assembly receives the inputs from the rotary switch arrangement, which input information acts to both amplitude (i.e. "key") and frequency modulate the tone generator, wherein the amplitude modulation (i.e. "keying") acts as the means for representing the encoded data while the frequency modulation acts as the synchronization means for the data transmission operation, in order to insure synchronous operation of the transmission and reception means at the remote 102a and central location 101 respectively, as will be more fully described. A tone receiver 124 connected between interlock circuit 108 and incoming telephone communication lines 103 is employed for receiving signals emanating from the central location, in a manner to be more fully described.

The data receiver 110 employed at the central location 101 is of the type set forth in aforementioned U.S. application Ser. No. 241,917. The data receiver 110 is so designed as to de-modulate or de-code the signals received from the remote location 102a through the carrier medium 103 and 105 and to perform a plurality of levels of security checks upon the data received, in order to insure its reliability for further use by the central location 101. A plurality of tone receivers 125 of the type 124 employed at remote location 102a are connected to incoming lines 105 for the purpose of recognizing remote location signals which employ a plurality of different frequencies. Although the remote locations generate a larger number of frequencies, only three tone receivers are shown in FIGURE 1 for the sake of clarity. The data receiver 110 is electrically connected to a data read-back device 111 by means of the connections designated by lead lines 119 and 120, which data read-back device 111 is designed to store data received and decoded by the data receiver 110 and to make available the decoded data received from the data receiver 110 back to the data receiver 110 for the purpose of transmission of this data back to the remote location 102a for the comparison phase of the communications cycle, as will be more fully described. The data read-back device 111 may take a variety of forms since the specific embodiment employed therein plays no novelty in the instant invention. For example, read-back device 111 may consist of a tape punch means and a tape-reading means wherein the data received from data receiver 110 through electrical connection 119 is permanently recorded by the tape punch means of read-back device 111, where it may remain stored in the tape in the form of appropriate punches. Upon initiation of the comparison phase of the communication cycle, the punched tape may then be read by the tape reader portion of data read-back device 11 and transmitted in the form of electrical impulses by means of electrical connection 120 through electrical receiver device 110 for retransmission to remote location 102a, as will be more fully described.

A credit check computer 112 is provided at the central location 101, which computer is provided for the purpose of receiving the encoded data from data read-back and storage device 111 through lead line 121 for the purpose of checking the credit of the customer desiring to make the purchase against the present status of the customer's account for the purpose of approving or disapproving the proposed credit transaction. The computer 112 may be of any well-known type which has the capabilities of storing large amounts of credit data, checking the stored data for the purpose of making the approval or disapproval decision responding to the remote location to apprise the remote location of its decision, entering the amount of the credit transaction upon receipt of the completed transaction signal from the remote location 102a and computing a new total for the credit customer wherein all of the recited steps operate at substantially high speeds. A wide variety of computers are available in the prior art for performing these functions, and any one of them may be employed herein, since the operation of the credit check computer 112 lends no novelty to the instant invention.

*Imprinter*

Referring now to FIGURE 2, an imprinter device 106 is shown therein which device is comprised of a base portion 11 and an upper portion 12, which house the components of the imprinter mechanism. The base portion 11 has a horizontal surface area 11a, which intersects with the front surface 12a of housing portion 12 to form a slot 13 thereat which is provided for receiving a printing plate 16 which plate may assume a variety of different forms. One form commonly employed as a portable charge plate is generally rectangular in shape and is formed of an embossable sheet of either metal or a sturdy plastic material. Type characters are then formed as raised embosures which project upwardly from the surface of the plate. The printing plate 16 is positioned in the slot 13 so that the type embossed surface faces vertically upward, for a reason to be more fully described. Elongated members 14 and 15 are fixedly secured to surfaces 11a and 12a and are provided to act as guiding means for facilitating the insertion of portable printing plate 16. A slot 17 is provided on the rear wall of imprinter device 107 for communicating with the slot 13 to form one continuous passage therethrough. The slot 17 is employed for the purpose of inserting a sales slip 39 or other type of sheet to be printed on. The sales slip is inserted into slot 17 so that it is interspersed between portable printing plate 16 and roller 18.

The roller 18 is a cylindrically shaped inking member which serves to imprint or ink the printed sales slip with the information contained in the portable printing plate in the form of the raised lettering. Such inking rollers are well-known in the art, and any well-known embodiment may be used herein since it lends no novelty to the instant invention. The sales slip or sheet 39 is inked by moving the roller 18 in the direction shown by arrow 25 which consists of the manual operation of moving the handle 19 in the direction of arrow 25. The roller 18 is operatively associated with the handle 19 by means of extending arms 20 and 21, which are secured to handle 19 at their upper ends and which serve to pivotally mount roller 18 at their lower ends by means of apertures therein which cooperate with the projections 18a and 18b which are rotatably engaged by the apertures and which are secured to the main body of roller 18. Thus it can be seen that the movement of handle 19 in the direction of arrow 25 causes the roller 18 to rotate in the clockwise direction over the sales slip 39 to effect the printing operation.

It should be noted, however, that the handle 19 is prevented from moving in the direction shown by arrow 25 due to the latch member 24 which engages pin 18a to prevent movement of the handle assembly 19. Latch member 24 is biased into engagement with pin 18a in any well-known manner, such as by a spring means which is designed to bias latch member 24 in the clockwise direction with respect to the pivot 24a of latch member 24. A solenoid 26 is provided, the armature of which is operatively connected to the latch member 24 and which, upon energization, urges latch member 24 in the counter-clockwise direction about its pivot point 24a so as to free the printing handle assembly to enable performance of the printing operation. Solenoid 26 is normally maintained in the de-energized state and is energized only upon receipt of a predetermined signal from the central location which apprises the imprinter mechanism of the fact that the proposed transaction has been approved by the central location, which operation will be more fully described. The slot 22 in upper housing portion 12 is provided for guiding the handle assembly 19 in the horizontal direction. Flanges (not shown) are provided on extending arms 20 and 21 which flanges are received by the horizontal slots 22 and 23 respectively for the purpose of guiding the handle assembly 19.

A switch member 30 is provided adjacent the right hand end of slot 22. The switch device 30 is designed to be open-circuited by means of a biasing member (not shown) which serves to maintain the switch internal contact member (not shown) in the disengaged position. Upon physical contact with the manually operable handle assembly 19, which occurs at the right-hand-most end of slots 22 and 23, a flange (not shown) of the extending arm 20 engages the switch 30 and overcomes the force of the internal bias member of switch 30, causing the internal contacts of switch 30 to move to the engaged position, thus establishing a current path therethrough for the purpose of apprising the central location of the fact that the transaction has been completed and that the central location should include this transaction in its tabulation of the customer's credit account therein. Any well-known limit switch operating in this manner may be employed as the switching device 30. For example, one type of switch which may be employed therein is the micro-switch arrangement wherein a protruding projection or button is provided for engagement with the flange member of the handle assembly 19, wherein the depression of the protruding button serves to move the micro-switch internal contacts towards engagement for the purpose of establishing a current path therethrough. Since this limit switch plays no part in the novelty of the instant invention, it should be understood that any other type or configuration of switch may be employed therein, which switch provides the desired function. The operation of the switch 30 with respect to the communication cycle will be more fully described.

A plurality of knurled rotatable members 27 project through openings provided therein on the horizontal surface 11a of lower housing 11. The rotatable members 27 are disc-shaped members which are mounted to rotate about their center axes. Each disc 27 is positioned in a plurality of discrete angular positions, each being representative of an alpha-numeric character. The knurled edges of the rotatable members 27 are provided to facilitate movement thereof by the operator of the imprinter device 107. Adjacent each movable member 27 is a window 28 beneath which a dial member (not shown) is mounted. Each dial member has imprinted around its edge the alpha-numeric characters and is movable under control of its associated rotatable member 27, wherein the alpha-numeric character positioned beneath the window 28 apprises the operator of the angular position occupied by the associated rotatable member 27. Thus, the operator has reliable means for ascertaining the angular positioning of the manually movable members 27.

FIGURE 2a is a blown-up perspective view of one such manually settable member 27. The rotatable member or disc 27 is secured to shaft 36, which shaft is mounted for rotation about its longitudinal axis. The disc-shaped member 41 is secured to shaft 40 and is rotatable therewith. The disc 40 has a width which is substantial enough to have imprinted thereon the alpha-numeric characters 42 which are representative of the angular positions to which the rotatable member 27 may be moved. Dial member 41 is rotated by means of discs 37 and 38 and endless belt 39 wherein disc 37 is secured for rotation to shaft 36 while disc 38 is secured for rotation to shaft 40. Rotation of disc 37 under control of the movement of disc 27 is imparted to disc 38 by means of endless belt or tape 39. The movement of belt 39 is subsequently imparted to disc 38, which causes shaft 40 and dial member 41 to be rotated, the amount of rotation being directly proportional to the amount of rotation undergone by settable member 27. The alpha-numeric characters 42, which are fixedly imbedded upon the edge of dial member 41, cooperate with the window 28 of housing surface 11a to apprise the operator of the position to which disc 27 has been moved. Disc 27 may be moved in either the clockwise or counter-clockwise direction, as shown by arrows 47. The knurled edge 27a of settable member 27 is provide to facilitate movement thereof. It should be understood that the number of discrete positions to which rotatable member 27 may be set is dependent only upon the needs of the user, and they include only alphabetic characters, only numeric characters, or may be a combination thereof.

A code stack assembly 43 is secured to shaft 36, and is rotatable therewith for the purpose of encoding the angular positioning of settable member 27 into a binary code representative of the angular position. The code stack arrangement 43 employed herein is of the type set forth in aforementioned pending U.S. application, Serial No. 125,247, now U.S. Patent No. 3,165,733. The shaft angle encoder described therein encodes the angular position of settable member 27 and, hence, shaft 36 into a binary coded arrangement, which code includes accompanying check bits for the purpose of ascertaining the accuracy of the code group transmitted to a remote location for the purpose of determining the reliability of transmission thereof. Since the specific coding arrangement is not the novel aspect of the instant invention, a thorough description of the coding arrangement will not be set forth herein, but reference should be had for a more thorough description to the above-mentioned U.S. patent. The binary code group for the discrete angular position of the settable member 27 is sensed by sensing members 45, which come into engagement with the code stack 44, the opposite ends of sensing members 45 being connected to leads 46 for interconnection with the data transmitter 109, shown in FIGURE 1, the operation of which will be more fully described. The number of settable members 27 which are employed in the imprinter mechanism 107 are sufficient to set and store therein the customer's credit identification number which, for example, may consist of a decimal number of ten digits, a merchant's identification number which, for example, may consist of decimal numbers 8 digits in length, and the amount of the intended purchase, which may, for example, consist of a six-decimal digit number, permitting inquiries for purchases from one cent ($0.01) to ten thousand dollars ($10,000.00). It should be understood that a greater or lesser number of settable members 27 may be employed for storing data therein, dependent only upon the needs of the user. The initiation of the communication cycle takes place by means of switch 29, which may be a micro-switch, for example, and which is housed in upper housing portion 12 and positioned adjacent the far edge of portable printing plate 16, so that upon engagement of the edge of printing plate 16 with the depressable button (not shown) on switch 29, the internal contacts of switch 29 are moved to the engaged position for the purpose of establishing a current path for energization of the programming or interlock circuit 108, in a manner to be more fully described. The lead lines 33 represent the electrical connections made between the imprinter mechanism 106 and the interlock or programming circuit 108.

*Dialer 107*

FIGURE 4 is a more detailed diagram of the dialer 107 of remote location 102a shown in FIGURE 1. The dialer is of the type described in aforementioned U.S. application Serial No. 126,278 now U.S. Patent No. 3,219,758. The aforementioned U.S. application is hereby incorporated herein by reference thereto for the purpose of avoiding a thorough description of the design and operation of the data transmitter. Basically, however, the data transmitter or dialer as it is designated in this application is comprised of a motor-driven rotating arm 50, which is adapted to engage a plurality of electrical contacts 51 through one complete circular sweep of the arm 50. The rotary arm engages contacts 51 in sequential fashion due to the angular alignment of these contacts. The rotary arm 50 has two sensing fingers 53 and 55 which come into engagement with the contacts 51 and 56 respectively during the rotation thereof to establish a current path, to be more fully described. The rotary arm 50 is driven by motor 57, which is connected to B+ through a fuse 58 parallel connected normally open contact pairs 59a and 60a. The opposite terminal of motor 57 is connected to ground 62 by lead 61. A delayed time relay 65 is disconnected to nodes 63 and 74 in parallel with motor 57 which relay controls the closing of normally open contacts 65a.

A third parallel path connected between nodes 63 and 74 consists of leads 66, conductive segment 68, resistor 67, conductive segment 69, lead 70, conductive segment 71, lead 72 and relay coil 59 to ground 62. Relay coil 59 controls the closing of normally open contacts 59a upon energization thereof. Normally open contacts 60a are controlled by relay coil 60 which is connected between ground potential and the interlock circuit 108 shown in FIGURE 1.

The arcuate segment 56 of the dialer mechanism is connected by conductor 79 to a positive bias of plus 12 volts D.C. For example, the output lead 78 of the dialer mechanism 107 is connected to the interlock circuit 108 of the remote location which interconnects the dialer 107 with the data transmitter for the purpose of amplitude modulating the data transmitter in a manner to be more fully described.

The rotary arm 50 which electrically connects the sensing members 53 and 55 acts to establish an intermittent current path between the D.C. bias 85 and the output lead 78 in the following manner.

The arm 50 rotates in the clockwise direction as shown by the arrow 86 and when the arm 50 moves into the start position marked by the X87, the sensing member 55 is slidably engaged by the arcuate segment 56. The sensing member 53 makes contact with the first segment 51′ establishing a current path from the D.C. bias 85, lead 79, arcuate segment 56, sensing member 55, rotary arm 50, sensing member 53, lefthand most segment 51′, which is electrically connected to conductor 81 and output lead 78.

As arm 50 continues to rotate in the clockwise direction shown by arrow 86, sensing member 53 becomes disengaged from contact member 51'. At this time no voltage appears at conductor 78 since the current path is open-circuited. Subsequently, sensing member 53 becomes engaged with contact 51" establishing a current path from D.C. bias 85, conductor 79, arcuate segment 56, sensing member 55, rotary arm 50, sensing member 53, conductive contact 51", lead 81, and output lead 78 which extends to the interlock circuit 108 shown in FIGURE 1.

The control circuit for the dialer mechanism 107 operates as follows:

Upon energization of relay coil 60 provided by the interlock circuit in a manner to be more fully described, relay 60 moves normally open contact 60a to the closed position establishing three current paths:

(1) From B+ to fuse 58, contact 60a, motor 57 and lead 61 to ground potential 62, thus energizing motor 57 which rotates arm 50.

(2) From B+ through fuse 58, contact 60a, relay coil 65 and lead 61 to ground potential 62, thus energizing relay coil 65 which closes normally open contact 65a a predetermined time after being energized for a purpose to be more fully described.

(3) From B+ through fuse 58, contact pair 60a, lead 66, coductive segment 68, resistor 67, conductive segment 69, conductive segment 71, lead 70, lead 72, and relay coil 59 to ground potential 62, thus energizing relay coil 59 which closes normally open contacts 59a in a self-locking arrangement to maintain the closed current path therethrough.

Thus, upon adequate energization from the interlock circuit of the relay coil 60, the rotary arm 50 is driven by motor 57 and is rotated continuously due to the lock-in feature of the relay coil 59 and its associated normally open contacts 59a.

The de-energizing operation of the dialer 107 is as follows:

The rotary arm 50, as it approaches the end of its complete revolution, rotates to the position where it is in angular alignment with conductive segments 69 and 76 such that sensing member 54 slidably engages conductive member 76 and sensing member 53 slidably engages conductive member 69. This establishes a current path from conductive segment 69 through rotary arm 50 to conductive segment 76, conductor 77 and lead 61 to ground potential 62, thus shunting out relay coil 59. This de-energizes relay coil 59, causing contacts 59a to return to their normally open position.

Delay timer relay coil 65 is designed so as to close normally open contact 65a after a time delay which is slightly longer than the time required for the rotary arm 50 to complete one revolution. The closure of contact pair 65a establishes a current path from conductive segment 69 to lead 61 on through ground potential 62, thus bypassing the relay coil 59 and de-energizing relay coil 59, causing contact pair 59a to return to its normally open state. Thus, the conductive segment 69 and 76 and the delay timer relay coil 65 and its associated contact pair 65a serve to de-energize the dialer mechanism 107 upon completion of one revolution. It should be noted that the de-energization of the dialer 107 occurs just prior to completion of the full 360° revolution so that the rotary arm 50 terminates its movement at the start or home point marked by the X 87 which places the dialer 107 in readiness for the next operation.

The dialer 107 is wired by conductor 81 in such a manner as to electronically generate pulse groups of the proper time duration and sequencing so as to simulate the pulsing operation which occurs in the dialing operation of telephone handsets presently in use. The dialing operation presently being used is, basically, as follows:

The telephone handset (not shown in the figures) is lifted from the cradle of the telephone. This establishes a current between the subscriber's telephone and the central exchange office nearest that subscriber. The dialing operation is performed by placing the finger in the finger-wheel hole associated with the letter or number of the dialing code being dialed at that instant. The finger-wheel is then rotated from its normal or rest position until the finger is impeded from further rotational movement by the abutting means provided on the telephone receiver. When the finger is removed from the finger-wheel hole the finger-wheel is urged counterclockwise towards its normal or rest position. During its return trip the finger-wheel causes the current loop, which has been set up between the subscriber and the central exchange, to be interrupted a number of times wherein the number of interruptions bears a direct association to the letter or number being dialed. The pause between the completion of dialing one number or letter and the initiation of dialing the next number or letter is sufficient in length to apprise the central exchange of the fact that a new number or letter is about to be dialed. The automatic switching equipment at the central location accordingly interprets the current loop interruptions and the interspersed pauses into the call letter code of the called party in the manner well known in the art.

The manual dialing operation is simulated by the dialer 107 in the following manner: The conductor 8 is wired to the conductive segment or contact 51 so as to form seven distinctive groups around the circular array of segment 51. For example, assuming that the central location has a call letter code which is Maine 3–4567, the manual finger operation requires that the dial code MA–3–4567 be dialed on the telephone finger-wheel. The conductor 81 is connected in such a manner as to simulate the letter M which is the first character of the remote location called code. This character is recognized by the telephone central exchange as six-spaced interrupts of the current loop, wherein the number of interruptions corresponds to the call letter character M. This is performed in the dialer 107 in the following manner:

Rotary arm 50, upon energization as previously described, rotates in the clockwise direction as shown by arrow 68 making slidable engagement with the first six segments 51 which are labeled in FIGURE 3 as the M group. Upon slidable engagement of the rotary arm 50 by the first such contact 51', the current passes from the plus voltage source 85, conductor 79, arcuate segment 56, sending member 55, rotary 50, sending member 53, contact 51' and lead 78, which is connected to the interlock circuit sight 108 shown in FIGURE 1. This establishes the current pattern for current loop between the remote location 102a shown in FIGURE 1 and the telephone automatic exchange equipment 104. As the rotary arm 50 moves further in the clockwise direction, sensing member 53 is positioned to the right of contact 51' thus interrupting the current loop set for the above, thereby placing certain voltage upon the interlock circuit. The rotational pattern continues in this manner until the appropriate number of interruptions occurs to simulate the call character M.

Since the interruptions to the current loop occur when the rotary arm 50 is intermediate to conductor segments 51, conductor 81 is electrically connected to the first seven conductive segments starting with conductive segment 51'. In the manual dialing operation, the time elapsed in moving the finger-wheel from the normal to a prechosen angular position is interpreted by the telephone central exchange dialing equipment as an indication of the termination of interruptions for the coded character being dialed. This is simulated by dialer 107 by omitting electrical connections to a plurality of conductive members, such as for example, the conductive members 51''' and 51'''' which provides a pause before the initiation of the next coded character. The overall waveform developed by the dialer 107 is shown in FIGURE 4a wherein the waveform 90 depicted is the electrical representation for the call letter code or telephone number Maine 3–4567 which, when dialed, is dialed as MA 3–4567. The waveform of FIGURE 4a represents the dialer voltage signal, however, and not the telephone line current. The unusued conductive segments 51 which lie immediately after the segments, which are electrically connected to conductor 81, enable a period of time to elapse which is sufficient for the telephone central exchange to ring the number Maine 3–4567 and to receive a busy signal or to establish a current loop between the remote location 102a and the central location 100 shown in FIGURE 1. Automatic means, which will be more fully described, cause the dialer 107 to become deenergized upon establishment of a current loop between remote and central locations or, in the alternative, cause the dialer 107 to re-dial the telephone number of the central location upon receipt of a busy signal. The re-dialing will continue until a current loop is established or until a cancellation push button is depressed which operations will be more fully described.

*Data transmitter*

Figure 5A:
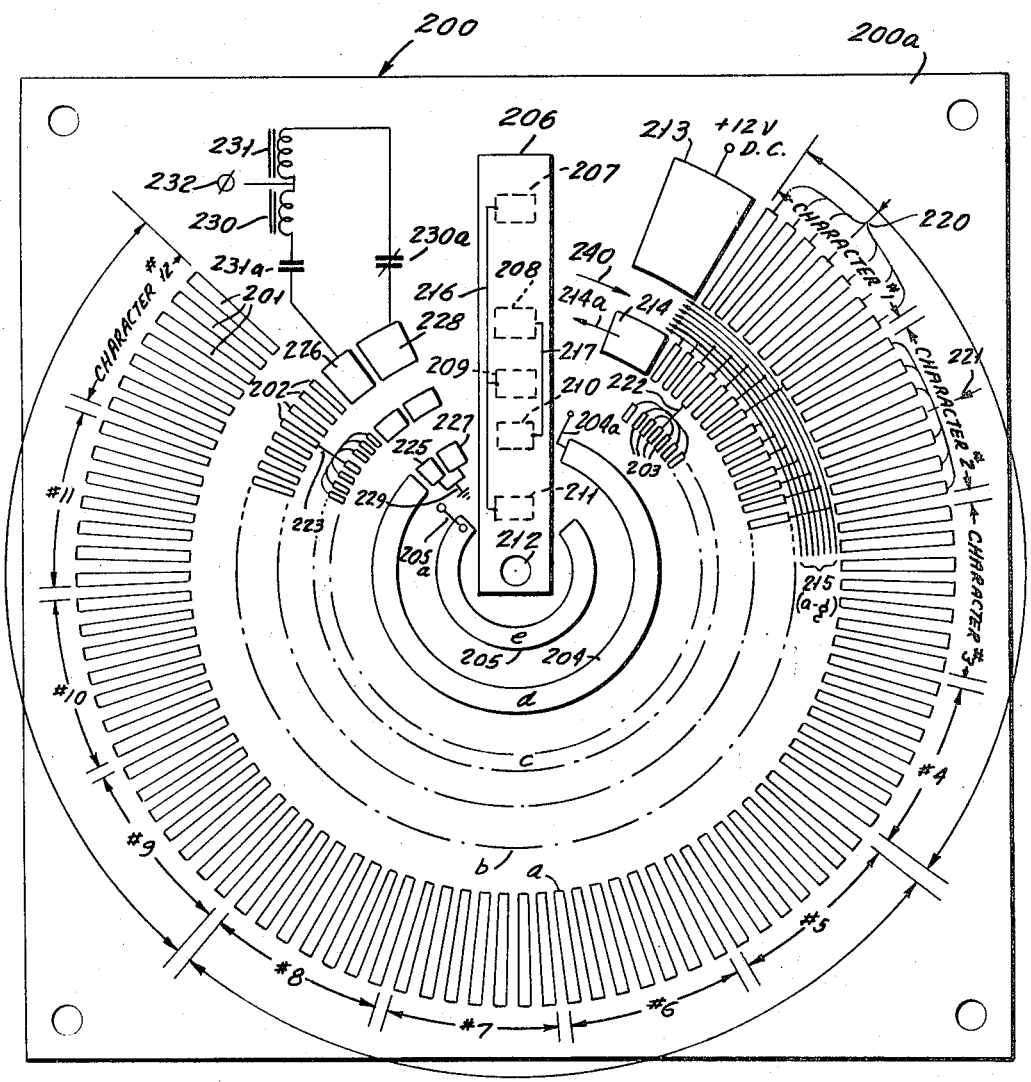

The data transmitter 109 shown in FIGURE 1 is shown in greater detail in FIGURES 5a, 5b and 5c wherein FIGURE 5a shows the sequencing portion 200 of the data transmitter. FIGURE 5b shows the tone generation circuit 300 and FIGURE 5c shows the control circuitry 350 for the sequencing apparatus 200 of FIGURE 5a.

The data transmitter 109, which is of the type set forth in aforementioned U.S. application, Serial No. 162,237, now Patent No. 3,196,213, basically consists of a sequencing device 200 which is comprised of a rotating arm 206 which is secured to shaft 212 for continuous rotation therewith under control of a motor means 351 to be more fully described in connection with FIGURE 5c. A plurality of sensing members 207–211 are mounted in rotating arm 206 for slidable engagement with the conductive segments of the tracks a through e which are arranged in circular arrays and positioned for slidable engagement with the associated sensing members of the rotary arm 206. A conductive segment of each track, a through e is positioned upon the surface of an insulating member 200a. One possible arrangement is the utilization of a printed circuit board but any other arrangement may be employed since this lends no novelty to the instant invention.

The sensing members 207, 209 and 211 are electrically connected to one another by means of conductor 216 while sensing members 208 and 210 are electrically connected to one another by conductor 217. The conductive segment 205 of track e is connected to a positive source 205a. The arcuate conductor 204 is connected to a negative D.C. source 204a. The conductive segments 201 which form the circular array of track a are electrically connected to the output leads of the shaft angle encoder 43 shown in FIGURE 2a. Seven such segments are employed for representing one alpha-numeric character which is accompaned by a check bit employed as a check upon the accuracy of transmission of the data. A complete description of the coding arrangement employed is set forth in aforementioned U.S. application Serial No. 125,247, now U.S. Patent No. 3,165,733. A sufficient number of segments 201 have been provided in track a for the receipt of 12 such coded characters which are impressed upon the segments 201 by means of leads such as 220 and 221. It should be understood that leads similar to 220 and 221 which emanate from the shaft angle encoder 43 of FIGURE 2a are connected in a like manner to the remaining conductor segments 201 which are included in track a.

Track c is made up of a number of segments equal to the amount of the number in track a and are adapted to be connected to output leads of the remaining shaft angle encoders. Track a is adapted to receive 12 coded characters and track c is adapted to receive the remaining 12 coded characters which combine so as to be adapted to receive all 24 coded characters from the 24 shaft angle encoders arranged in the imprinter device 106 shown in FIGURES 1 and 2. The segments of track b which are in angular alignment with associated segments in track a and c are employed for the purpose of altering the tone frequency of the tone generator 300 shown in FIGURE 5b for synchronization purposes, as will be more fully described.

The conductive segments 225 and 227 of track d and 226 and 228 of track b are employed for the purpose of selecting which of the tracks (track a or track c) will be chosen for transmission since both groups of encoded characters may not be transmitted simultaneously, but require rotary arm 206 to make two complete revolutions for the purpose of transmitting the encoded data to the central location 100. The relay windings 230 and 231 and their associated contact pairs 230a and 231a, respectively, are electrically connected between the conductive segments 225 through 228 and a voltage source 232 for the purpose of selecting one of the two tracks for transmission of the uncoded data in a manner to be more fully described.

The tone generator sub-assembly 300 of the data transmitter consists of a transistor 301 having an L-C tuned circuit consisting of multi-tap conductor 303, capacitor 304 and capacitor 305 which are electrically connected to the connector 302 of transistor 301. A portion of the energy developed by tank circuit is fed back to the emitter terminal 315 of transistor 301 by means of conductor 308 which is connected to the terminal 318 between capacitors 304 and 305 at one end and to emitter terminal 315 at the other end. The multiple taps 316 provided along inductor 303 are employed for altering the output frequency of the tone generator 300 in a manner to be more fully described. The output of the tone generator 300 is taken across resistor 307 which is connected to the emitter terminal 315 of transistor 301. A coupling transformer 312 having its primary side 312a connected across resistor 307 and its secondary 312b connected to conductors 318 and 319 is provided as a tone-generator-to-telephone-line coupling means for the purpose of impedance matching. A pair of open terminals 320 and 321 maintain conductor 318 in an open circuited condition with respect to conductor 318a so that no transmission may take place between tone generator 300 and the central location 100 shown in FIGURE 1. The shorting out of terminals 320 and 321 for the purpose of enabling transmission is provided by the interlock circuit 108 shown in FIGURE 1 as will be more fully described. A second transformer 322 has its primary 322a connected across conductors 318 and 319 and its secondary 322b connected to the input terminals of the tone receiver shown in FIGURE 7 of the instant application the operation of which will be more fully described. Transformer 322 is provided to insure isolation between transmitted and received signals passing through the telephone line 318a and 319.

A voltage divider circuit consisting of potential source 323 and series connected resistors 309 and 310 are connected to the base terminal 304 of transistor 301. The input terminal 311 to the tone generator circuit 301 is connected to the e track of the sequencing means 200 shown in FIGURE 5a by means of the interlock circuit 108 in a manner to be more fully described. When no signal is impressed upon input terminal 311 base electrode 324 of transistor 301 is maintained at a negative potential causing transistor 301 to be in a conductive state causing a tone to be transmitted through telephone lines 318a and 319. The frequency of the tone transmitted is determined by the connections to the taps 316 of tap conductor 303 in a manner to be more fully described.

The data transmitter control circuit 350 shown in FIGURE 5c consists of an energy source 360 for energizing the data transmitter motor-driven means 351, a plurality of contact pairs 355 and 356 control the energization of motor means 351 in a manner to be more fully described.

The operation of the data transmitter is as follows:

Under control of the interlock circuit 108 in FIGURE 1, contact pair 355a is moved to a disengaged position. This completes a current path from energy source 360 through fuse 361, contact pair 355a and motor 351 to ground potential 354. A second current path is established through resistor 359 and relay coil 356 which elements are connected at parallel across motor 351 causing the energization of coil 356 to a closed position thus locking in the energization of motor 351 and relay coil 356.

The energization of motor 351 drives rotary arm 206 which is connected to motor 351 by shaft 212 in the clockwise direction shown by arrow 240 in FIGURE 5a. The sensing member 207 of rotary arm 206 makes slidable engagement with the first conductive segment 301 of track a at the same time that sensing member 211 makes slidable engagement with conductive segment 205, thus establishing a current path from the first conductive segment 201 to conductive segment 205 by means of conductor 216. Arcuate segment 205 which is connected to the interlock circuit 108 of FIGURE 1 is impressed upon the input terminal 311 of the tone generator 300 shown in FIGURE 5b which connection within the interlock circuit will be more fully described. The conductive segments 201 of track a are sequentially engaged by sensing member 207 and impressed upon the input terminal 311 of tone generator 300 causing the information from the shaft angle encoder, such as encoder 43 shown in FIGURE 2a, which information is available in parallel to be read out in serial fashion by the sequential means 200. Thus, the first 12 encoded characters are transmitted through the tone generator 300.

As the rotary arm 206 comes into angular alignment with conductive segments 227 and 228, a current path is established at this instant from ground potential 229 to segment 227, sensing member 210, conductor 217, sensing member 208, segment 228, normally closed contacts 230a and relay coil 231 to energy source 232. The energization of relay coil 231 causes normally open contacts 231a to move to the closed position. The energization of relay coil 231 further controls the selection of the encoders connected to the segments in the track b array in readiness for the next complete revolution of rotary arm 206. The manner of selection of the segments of track a or the segments of track b will be more fully described in connection with the interlocked or programming circuit 108 which is shown in FIGURE 6. The relay contacts 231a are of the slow-to-release type so that they maintain their engagement until rotary arm 206 makes its second revolution at which time it comes into angular alignment with conductive segments 225 and 226. At this time a current path is established from ground potential 229 through segment 225, sensing member 210, conductor 217, sensing member 208, conductive segment 226, engaged contact pair 231a and relay coil 230 to energy source 232. The energization of relay coil 230 opens normally closed contact pair 238 so that a current path will not be established therethrough as the rotary arm rotates in that direction and it further selects the second group or remaining group of the 24 shaft angle encoders which group is connected to conductive segments of the track a array, thus placing the equipment in readiness for subsequent transmission.

The information is encoded in binary form so that either a zero voltage or a positive voltage exists at each conductive segment 201 of track a which voltage levels are received from the shaft angle encoders' output terminals in the imprinter mechanism 106. Positive D.C. pulses impressed upon the input 311 of tone generator 300 cause the tone generator to be de-energized by driving transistor 301 into cut off, whereas zero voltage present at the input terminal 311 causes the base of 324 of transistor 301 to become more negative thus driving transistor 301 into a conductive state.

Inductor 303 is provided with a number of taps 316 for synchronizing purposes. The manner in which this is performed is as follows:

The conductive segments 220 of track b shown in the sequencer 200 of FIGURE 5a are connected by means of leads 215a through 215g to the inductor taps 316a through 316g. Upon initiation of transmission a current path is established from arcuate segment 204 which is at a minus potential to sensing member 210, conductor 217, sensing member 208, and contacts 200, conductors 215a through 215g to taps 316a through 316g. The employment of a minus potential upon the taps 316a through 316g in this sequential fashion causes the tuned circuit comprising inductor 303 and capacitor 305 to assume a definite resonant frequency depending upon the taps 316a through 316g which has the negative voltage impressed upon it. It should be noted that each contact 220 is in angular alignment with an associated contact 201 in track a of the sequencer device 200. Thus it can be seen that the information from encoders 27 within imprinter mechanism 106, by impressing thereon binary coded information upon contacts 201, acts to amplitude modulate tone generator 300 of FIGURE 5b and the contacts 202 in track b of sequencer 200 act to frequency modulate the tone generator 300 in such a manner that the amplitude modulation is recognized at the central location as the binary coded data while the frequency modulation of the received carrier is recognized as the synchronizing means for the binary data being transmitted.

*Interlock circuit*

The programming for interlock circuit 108 shown in FIGURE 1, is shown in more detail in FIGURE 6, wherein the interlock circuit 108 is comprised of a plurality of stacks 410 through 470 of contact banks wherein each stack contains a plurality of contacts 412–0 to 412–9 through 472–0 to 472–9 respectively. Each bank of contacts 412 through 472 is slidably engageable with associated rotary arm 411 through 471 respectively which sequentially engages the contacts of its associated bank. The rotary arms 411 through 471 are secured to a common shaft 490 which controls the rotation of all rotary arms 411 through 471 connected thereto. In addition the rotary arms 411 through 471 are angularly aligned so that all arms engage the contacts having the same number designation as that of every other contact bank. For example, when rotary arm 411 is aligned so as to engage contact 412–0 of contact bank 410, it should be noted that the remaining rotary arms 421 through 471 likewise engage the zero contact of their respective contact banks 422 through 472. The common shaft 490 receives its driving energy from electromagnet 491 which, when energized, cocks a drive spring (not shown). Upon removal of the energization from electromagnet 491, the energized spring releases its energy to actuate a pawl-ratchet mechanism thereby moving the rotary arm clockwise to the next contact point. Auxiliary contacts 487 and 488 are provided to perform control functions. Contacts 488, which are separated each time the switch steps one position, are called "interrupter" contacts. Contacts 487 are adapted to be separated each time the rotary switch arrangement makes one complete revolution and returns to the home or zero contact position and are, therefore, known as "off normal" contacts. The function of contacts 488 is to permit performance of the program steps at each contact position prior to stepping to the next contact position. The function of contacts 487 is to prevent stepping beyond the home position at the end of a complete revolution, in readiness for the next interlock circuit cycle. Rotary arm 411 of contact 410 is electrically connected at its center point through a control push button 484a to a relay coil 481, the opposite ends of which is at ground potential 482. Two additional branch paths are connected at the connection of control push button 484a and relay coil 481. The first branch consists of series connected formally open contacts 481b which operate under control of relay coil 481 and interrupter contacts 488, the opposite terminal of which is connected to energy source 483. The second branch consists of the parallel connected limit switch 485a and a second pair of control push button contacts 484b in series with normally open contacts 486 and "off normal" contacts 487, the opposite terminal of which is connected to potential source 483.

Contacts 412–0 through 412–4 are actively employed in the interlock circuit program cycle. Contact 412–0 is connected to limit switch contact arrangement 501 which is the schematic representation of the limit switch 29 shown in FIGURE 2 of the instant application. The other terminal of limit switch contact 501 is connected to potential source 483 for the purpose of initiating the program cycle as will be more fully described. Contact 412–1 is connected to rotary arm 421 of contact bank 420 via conductor 421a and to normally open contact pair 650b by means of conductor 495. Contact 650b is under control of tone receiver 600 shown in FIGURE 7 which operates in a manner to be more fully described.

Contact 412–2 is electrically connected to normally closed contact pair 496a via conductor 497, contact pair 496a being under control of relay coil 496 of FIGURE 6. Contact 412–3 is connected to contact pair 502 by means of lead 503. Contact pair 502 is under control of relay coil 504 which relay is connected between ground potential 428 and contact 422–3 of contact bank 420. An indicator lamp 505 connected in parallel across relay coil 504 serves as a visual indicator of the data received from the central location 101 shown in FIGURE 1 of the instant application which operation will be more fully described. Contact 412–4 is connected by means of lead 506 to the series connected elements of normally closed contacts 750a and 496b. Normally closed contact pair 750a is controlled by relay coil 750 in error check circuit 700 of FIGURE 9 which circuit will be more fully described. The series connected element 750a and 496b are connected to bus 507 which serves as the main supply bus for the potential source 483.

Rotary stack 420 utilizes only contact 522–3 which is connected to one side of relay coil 504 by means of conductor 508.

Rotary stack 430 has its rotary arm 431 connected to a negative source of contact potential. Contact 432–1 is electrically connected to tap 317 of inductor 303 of the transmitter 300 shown in FIGURE 5b, for developing a predetermined tone frequency for utilization during transmission in a manner to be more fully described. Contacts 432–2 and 432–4 are electrically connected to one another by conductor 509 which, in turn, is connected to arcuate segment 204 in track d of the sequencer 200 shown in FIGURE 5a. Contacts 432–3 and 432–5 are electrically connected to terminal 510 which, in turn, connects these contacts to tap 316a of inductor 303 shown in FIGURE 5b via limit switch contact arrangement 511 which is the schematic representation of limit switch 30 of the imprinter 106 shown in FIGURE 2 of the instant application. Also connected to terminal 510 is a third contact pair 484c of cancel push button 484, the opposite terminal of which is connected to tap 316c of multi-tap inductor 303.

Rotary stack 440 has its rotary arm 441 electrically connected to input terminal 311 of tone generator 300 shown in FIGURE 5b. Contact 442–1 of contact bank 440 is connected to output lead 78 of dialer 107 shown in FIGURE 3 of the drawings. Contact 442–2 is connected to contact 452–2 of contact 450 shown in FIGURE 6. Contacts 442–3 and 442–5 are connected together to one side of a fourth pair of contacts 484d of cancel push button 484, the other terminal of which is cennected to a positive D.C. source 520. A second branch connected across shunted terminals 442–3 and 442–5 consists of contacts 511 which are the schematic representation of the limit switch 30 shown in FIGURE 2 of the drawings and which serve as an alternate path for placing a positive voltage upon contacts 442–3 and 442–5. Contact 442–4 is directly connected to positive voltage source 520.

Rotary arm 451 of contact bank 450 is connected via conductor 521 to arcuate segment 205 in track e of the sequencer 200 shown in FIGURE 5a. Contact 452–2 is electrocally connected to contact 442–2 of rotary stack 440 as previously described. Contact 452–4 is connected to an input terminal 801 of comparison circuit 800 shown in FIGURE 9a of the instant application which circuit will be more fully described.

Rotary arm 461 is electrically connected to potential source 483 via a fifth contact pair 484e of the cancel push button arrangement 484. Contact 462–1 of contact bank 460 is connected to relay coil 60 of dialer 107 (see FIGURE 4) via limit switch contacts 501a which schematically represent limit switch 29 in interrupter 106 shown in FIGURE 2 which switch serves to electrically connect relay coil 60 to contact 462–1 when limit switch contacts 501a are in a closed position as will be more fully described. Contact 461–2 and 461–4 are electrically connected to one another and to normally open contact pair 496c, the other terminal of which is connected to terminal 306 of the transmitter control circuit 350 shown in FIGURE 5c of the drawings, for the purpose of initiating operation thereof in a manner to be more fully described. Contact 462–5 is electrically connected to relay solenoid 525, the opposite end of which is connected to ground potential 482, relay solenoid 525 being adapted to unlatch the imprinter operating handle 19 (see FIGURE 2) as will be more fully described.

The rotary arm 471 of rotary deck 470 is connected to terminal 320 of tone transmitter 300. Contacts 472–1 through 472–6 are electrically connected to one another and to terminal 321 of FIGURE 5b for the purpose of completing the current path across terminals 320 and 321 during transmission by the remote location device as will be more fully described.

The sequencing of encoder groups of shaft angle encoders 27 shown in FIGURE 2 is under control of normally open and normally closed contact pairs 230b and 231b respectively which are electrically connected to a positive constant potential source 520 (see FIGURES 6 and 3). The opposite terminals of contact pairs 230b and 231b are electrically connected to the common terminals of group 2 encoders and group 1 encoders respectively as will be more fully described in connection with FIGURE 3 of the instant application.

FIGURE 3 is a schematic diagram showing the electrical connections of the imprinter 106 in greater detail and showing the association with dialer 107 and data transmitter 109. The portable printing plate 16 of the imprinter operates the limit switch contacts 501 which are the schematic representation of the switch 29 shown in FIGURE 2, the cooperative association being represented by dashed line 16a. The limit switch 501 is biased (by means not shown) to a normally open position. Upon the insertion of portable printing plate 16 into the imprinter 106, the printing plate 16 causes a mechanical closure of the contacts of limit switch 501. Upon removal of printing plate 16 the contacts of limit switch 501 return to their normally open state.

A second limit switch 511 in FIGURE 4 schematically represents switch 30 shown in FIGURE 2. The print roller arrangement of FIGURE 2 which consists of elements 18 through 32 is represented by block 18–21 in FIGURE 4, which assembly is cooperatively associated with limit switch 511 as represented schematically by dashed line 20a. The operation of the printer arrangement is such that in moving the roller 18 (see FIGURE 2) across portable printing plate 16 the flanged portion of the extending arm 20 abuts limit switch 30 urging the normally open contacts 511 to a closed position. The functions which the limit switch as 501 and 511 perform will be more fully described in the description of the operation of interlock circuit 108.

The shaft angle encoders 27 which are repersented schematically by blocks 27 in FIGURE 4 are mechanically connected to manually settable knobs 27a as described with reference to FIGURE 2 wherein the mechanical linkage is represented by dashed lines 36–40. The shaft angle encoders are divided into two separate groups so that the twelve left-hand most encoders are connected to lead 530 which connects the encoders to energy source 520 through normally closed contacts 230 (which are also shown in FIGURES 5a and 6). The twelve right-hand most (i.e. the twelve remaining) shaft angle encoders 27 have their common terminals connected to conductor 531 which is connected to source 520 via normally open contacts 230b. The opposite terminals of contacts 230a and 230b are connected to a D.C. potential 520, as will be more fully described. Only one of the two groups of shaft angle encoders are energized at any given instant. In the arrangement of the preferred embodiment set forth herein the shaft angle encoders of group I are energized first, the shaft angle encoders in group II being subsequently energized in a manner to be more fully described. The output leads 45 of each shaft angle encoder (note also FIGURE 2a of the instant application) are connected to the segments 201 of the sequencer 200 shown in FIGURE 5 of the instant application, but are shown schematically in FIGURE 4 merely by lead lines 220 connected to data transmitter 109.

*Tone receiver*

The tone receiver 600, shown in FIGURE 7, has three parallel tuned circuits, each consisting of inductances 601, 602 and 603 and associated capacitors 604, 605 and 606, respectively, connected in a series arrangement across input terminals 658 and 657. The tuned circuits are adjusted to receive a specified frequency. The output of the tuned circuit arrangement is taken between terminal 660 and ground potential 657. The voltage of terminal 660 is impressed upon the base 613 of PNP transistor 612 via capacitor 607. A potential divider circuit consisting of series connected resistors 608, 609 and 610 which are connected between ground potential 657 and potential source 661 for the purpose of maintaining transistor 612 in the cut-off state. Capacitor 611 is connected in parallel across resistors 609 and 610 for the purpose of stabilizing voltage across these terminals. Resistor 617 connects the emitter 615 of transistor 612 to ground potential 657 while resistor 619 is connected between voltage source bus 661 and the collector 614 of transistor 612. The output of transistor 612 is taken from the emitter terminal 615 of transistor 612 which is connected to base electrode 623 of transistor 622 via capacitor 620. A resistor 621 is connected between capacitor 620 and base electrode 623 at one end while its opposite terminal is connected to ground potential 657. Resistor 626 connects the collector electrode 624 of transistor 622 to negative voltage bus 661 while resistor 628 connects the emitter terminal of transistor 622 to ground potential 657. The capacitor 627 placed in parallel across resistor 628 which parallel arrangement acts to bias transistor 622 to the cut-off state. The output of transistor 622 is taken from the collector terminal 624 and impressed upon the base 633 of transistor 630 which has its collector electrode 631 directly connected to negative voltage source 661 and its emitter electrode 632 connected to ground potential via resistor 634. The output of transistor 630 is taken from the emitter terminal 632 and impressed upon a one-shot multi-vibrator 644 by means of lead 635 for a purpose to be more fully described. The emitter 632 of transistor 630 is also connected to the base 639 of transistor 638 via resistor 636. Collector 640 of transistor 638 is connected to negative bus 661 by means of resistor 642 while emitter terminal 641 is connected to ground potential 657 through resistor 642. The output of transistor 638 is taken from the collector electrode 640 and is impressed upon the input of one-shot multi-vibrator 647 by means of lead 643 for a purpose to be more fully described.

The one-shot multi-vibrators 644 and 647 which are represented only schematically in FIGURE 7 are multi-vibrators of the type such that upon the receipt of a positive voltage at their input terminals 645 and 648 respectively, the multi-vibrators make a transition to the set state and remain in the set state for a pre-determined period of time after which they automatically reset themselves. Thus, the impression of the positive pulse 662 of waveform 660 upon the input terminal 645 of one-shot multi-vibrator 644, produces the pulse 663 of waveform 661 at the output terminal 646. It can be seen that the output at 696 rises from a zero voltage level (664) to a positive voltage level 665 and remains in the positive state a predetermined period of time ($t_1$) which is independent of the duration ($t$) of the positive pulse 662 impressed upon the input 645 of one-shot multi-vibrator 644. In essence, the multi-vibrators 644 and 647 are arranged so as to produce a square pulse upon the occurrence of a voltage spike at its input terminal whereby the pulse width of the output pulse is substantially greater than the pulse width of the voltage spike at its input and wherein the pulse width of the output waveform is independent of the pulse width of the input voltage.

The output terminals 646 and 649 of one-shot multi-vibrators 644 and 647 respectively are connected through associated emitter follower circuits 651 and 652 to the input terminals of logical OR gate 653, the output of which is connected through emitter follower 654 to one terminal 655 of tone receiver relay coil 650, the opposite end of which is connected to ground potential 657.

The operation of the tone receiver which will be more clearly understood in conjunction with the waveforms shown in FIGURE 8 is as follows:

The tuned circuits 601–604, 602–605, and 603–606 are adjusted so as to be tuned to a frequency $f_c$ which is the center frequency of the curve 666 shown in the plot 665 of FIGURE B. The curve 666 is a normal frequency response curve for tuned circuits of this nature. The tone receiver is adjusted so as to accept only those frequencies which lie within the limits shown by the phantom lines 667a and 667b which represent the low center frequency side and the high center frequency side, $f_{cl}$ and $f_{ch}$ respectively. This is also pointed out in the graph 670 which shows two waveforms, 671 and 672 which alternate about a reference potential line 680 wherein the waveform 671 represents a frequency which lies between the low and high frequency limits 667a and 667b respectively. The waveform 672 which lies outside of the low and high frequency limits is substantially attenuated by the tuned circuit arrangements as can be seen by the amplitude of this waveform shown in the graph 670. Point 677 which lies on the waveform 671 represents the threshold voltage necessary for placing the one-shot multi-vibrators 644 and 647 respectively into the set state mentioned previously in a manner to be more fully described.

The frequency signal which is impressed upon input terminal 657 and 658 of the tone receiver 600 and which it is assumed lies between the upper and lower frequency limits, is passed by the tuned circuit arrangement and subsequently impressed upon the base 613 of transistor 612. The transistor 612 is biased to act as Class A amplifier which is arranged as an emitter follower.

The output is taken from emitter electrode 615 of transistor 612 and is impressed upon the base 623 of transistor 622. Assuming that the amplitude of the signal impressed upon the input of tone receiver 600 is represented by the point 677 of wave-form 671, the output at terminal 615 will be in phase with the signal. This positive going signal which is impressed upon the base 623 of transistor 622 drives transistor 622 towards cutoff causing the voltage at the output or collector terminal 624 to become more negative. This negative going signal is impressed upon the base 633 of transistor 630 driving transistor 630 towards saturation. The transistor 630 which is operated as an emitter follower develops an output signal at the emitter electrode 632 which is in phase with signal at its base electrode 633 and which negative-going signal is impressed upon the input terminal 645 of multivibrator 644. The negative-going voltage appearing at the emitter electrode 632 of transistor 630 is impressed upon the base electrode 639 of transistor 638 driving transistor 638 towards saturation. The output from transistor 638 is taken at the collector terminal 640 which is a positive going signal and which is 180° out of phase with the signal present at its base electrode 639a and with the signal at the emitter electrode 632 of transistor 630. This signal is impressed upon the input 648 of one-shot multi-vibrator 647 by means of conductor 643.

The voltage level appearing at the collector terminal electrode 643 of transistor 638 is represented by the waveform 671 while the voltage appearing at the emitter electrode 632 of transistor 630 is represented by the waveform 673 shown in the graph 670. At the instant of time when the voltage at the collector electrode 643 is at the point 677 shown in graph 670, the voltage at the input terminal 648 of one-shot multi-vibrator 647 is sufficiently positive to overcome the cut-off bias (not shown) of the multi-vibrator driving it into the set state, which is shown by the level 665 of waveform 663 shown in FIGURE 7. The time duration of the voltage level $t_1$ is, as was previously explained, completely independent of the width of the positive going signal which is impressed upon the input terminal 648 of multi-vibrator 647.

At this same instant of time the voltage appearing at the emitter 632 of transistor 630 reaches the point 637a on waveform 678 shown in graph 670. Since this is a negative-going signal, multi-vibrator 644 will not be driven into the set state at this instant of time. The output of multi-vibrator 647 is shown in curve 670c. The pulse width $t_1$ of pulse 674 is approximately 60% of the cycle of waveform 67 impressed upon the input of the tone receiver 600. This relationship can be seen by the phantom lines 681 and 682. After a predetermined time, the voltage at the emitter electrode 632 reaches the point 678 shown in graph 670 at which time the voltage at the collector electrode 640 of transistor 638 reaches the point 683 on the waveform 671. The voltage level represented by the point 678 and which is impressed upon the input terminal 645 of multi-vibrator 644 drives multi-vibrator 644 into the set state causing it to generate the square wave pulse 675 shown in graph 670. The voltage appearing at the collector electrode 640 of transistor 638 which is at the negative level shown by point 683 of curve 670 is insufficient to drive multi-vibrator 647 to the set state so that multi-vibrator 647 will automatically reset itself as previously described, a time period of length $t_1$ after it made the transition to the set state. The output 646 and 649 of multi-vibrator 644 and 647 are impressed through the emitter followers 651 and 652 respectively upon the inputs of logical OR gate 653. It should be noted from curve 670c and 670d that pulses 674 and 675 overlap one another causing the output pulse generated by logical OR gate 653 to be that shown by pulse 676 of graph 670d, thus forming one square pulse output signal. This square pulse is impressed upon the relay coil 650 via emitter follower 645. It should be noted that with the appearance of a continuous signal such as that shown in graph 670 that the square pulse formed at the output of the logical OR gate 653 will have a pulse width $T_2$ which is equal to the time period during which the waveform 671 is impressed upon the input of tone receiver 600, and which resulting square pulse is shown in graph 670e by dashed line 685.

A signal which falls outside of the upper and lower frequency limits 667b and 667a respectively will fail to form a single composite square pulse 673 shown in the graph 670e, due to the fact that input signals outside of the accepted frequency range are sharply attenuated by the tuned circuit arrangement. The tone receiver 600 is employed at both central and remote locations 110 and 102a respectively for the purpose of being responsive to predetermined frequencies which are utilized for specified intelligence purposes as will be more fully described.

*Error monitoring circuit*

The error circuit 800 which is employed in the imprinter mechanism 108 is shown in FIGURE 9a and is adapted to perform a bit-by-bit comparison check upon the data received from the central location with the data stored in the encoder mechanism 27 shown in FIGURES 2 and 2a. The error check circuit 800 is comprised of two input terminals 801 and 802 for receiving the data pulses from the remote and central locations respectively. The remote location signals impressed upon terminal 801 are connected to the input terminal 807 of a one-shot multi-vibrator 806 of the type employed in tone receiver 600 shown in FIGURE 7 of the drawings. A first output terminal 808 of multi-vibrator 806 is connected to an input terminal of logical AND gate 820 through emitter follower 815–10. The second output terminal 809 of multi-vibrator 806 is impressed upon the SET input terminal 812 of flip-flop 811. The signals received from the central location are transferred from input terminal 802 through inverter 803 to the RESET input terminal 813 of flip-flop 811. The input signal from the central location is also impressed upon one input terminal of logical AND gate 818.

The operation of inverter 803 is such as to invert the phase of the signal impressed upon its input by 180° so that if the signal appearing at its input is positive-going than the signal appearing at its output will be in the negative-going direction. Flip-flop 811 shown schematically in FIGURE 9a is so arranged as to have 2 stable states, namely, the SET and the RESET state. The operation of the flip-flop 811 is such that a positive-going signal impressed upon the input terminal 812 which is of sufficient amplitude to drive the flip-flop 811 to the SET state causing the output voltage at the output terminal 814 of flip-flop 811 to be driven in the negative-going direction while the output voltage at terminal 815 will be driven in the positive-going direction. The operation of the flip-flop 811 differs from the multi-vibrators previously described in that the flip-flop 811 will remain in the SET state indefinitely and must receive a RESET pulse at its input terminal 813 to return to its RESET state in readiness for being driven to the SET state at some subsequent time.

The output signals of terminals 814 and 815 of flip-flop 811 are impressed upon the inputs of logical AND gates 818 and 820 respectively by means of emitter followers 816 and 817 respectively. The outputs of logical AND gates 818 and 820 are impressed upon the input terminals of logical OR gate 822 by means of emitter followers 819 and 821 respectively. The output signal of logical OR gate 822 is impressed upon the SET input terminal 826 of flip-flop 825 via emitter follower 824. The RESET input terminal 827 of flip-flop 825 is connected to a negative voltage source 805 by means of resistor 829 and is also connected to a negative source (B—) through normally open contacts 356c shown in FIGURE 5c employed for the purpose of resetting flip-flop 825 as will be more fully described. The output terminal 828 of flip-flop 825 is connected to the solenoid 830 through emitter follower 829. Solenoid 830 is grounded at its terminal 832.

The operation of the comparison circuit is as follows:
The data received by the comparison circuit 800 consists of the binary information which is first transmitted to the central location 101 shown in FIGURE 1 and which is now being sent back from the central location for the purpose of checking its accuracy against the binary coded data stored in the encoder devices 43 (see FIGURE 2a). The maximum amplitude 832 of waveform 831 (see FIGURE 9a) represents the binary ONE and the minimum amplitude or reference level 833 of waveform 831 represents binary ZERO.

In order to describe the operation of the comparison circuit 800 it will be assumed that the signals appearing at the input terminals 801 and 802 are represented by the waveforms 831 and 835 respectively, wherein, the pulse 831 represents the presence of a binary ONE at the input 801 and the pulse 835 represents the presence of binary ZERO at the input terminal 802. The ONE state present at the input terminal 807 of multi-vibrator 806 causes the multi-vibrator to be driven to the SET state generating a binary ZERO at the output terminal 808 shown by waveform 836 and a binary ONE shown by waveform 837 at the output terminal 809 of multi-vibrator 806. The binary ONE signal from output terminal 809 is impressed upon the SET input terminal 812 of flip-flop 811, driving flip-flop 811 into the SET state so that a binary ONE signal appears at output terminal 915 of flip-flop 811 and a binary ZERO signal appears at the output 814 of flip-flop 811. The binary ZERO signal 835 impressed upon terminal 802 is impressed upon inverter 803 causing a binary ONE signal to be generated at the output of inverter 803 and to be impressed upon the RESET input terminal 814 of flip-flop 811. Assuming that no error has occurred up to this point during the comparison check, the presence of binary ONE signals at the SET and RESET input terminals 812 and 813 respectively drive flip-flop 811 to the SET state causing a binary ZERO to be present at the output terminal 814 and a binary ONE signal to be present at the output terminal 815. The binary ZERO signal for terminal 814 is transferred via emitter follower 816 to logical AND gate 818 together with the binary ZERO impressed in terminal 802 causing a binary ZERO signal to appear at the output of AND gate 818 and to be impressed upon ONE input terminal of OR gate 811 through emitter follower 819. The output of OR gate 822 is impressed upon the input SET terminal 826 of flip-flop 825 through emitter follower 824. Since this is a binary ZERO signal which is impressed upon the SET input terminal 826, flip-flop 825 will remain in its last state.

Simultaneously with this operation, the binary signal appearing at the output terminal 808 of multi-vibrator 806 is impressed upon the ONE input terminal of AND gate 820 along with the binary ONE signal from the output terminal 815 of flip-flop 811. Since the signals impressed upon the input of AND gate 802 are binary ONE and binary ZERO, AND gate 802 generates a binary ZERO output pulse which is impressed upon the input of OR gate 822 via emitter follower 821 and subsequently, upon the input SET terminal 826 of flip-flop 825 via emitter follower 824. Thus, no set signal is impressed upon input terminal 826 enabling flip-flop 825 to remain in its RESET state (to which it was previously set by the closure of relay contact 356 shown in FIGURE 5c in a manner to be more fully described). Flip-flop 825 being in the RESET state develops a binary ZERO or negative level signal at its output terminals 828 which signal is impressed upon relay coil 830 through emitter follower 829. Since terminal 832 of relay coil 830 is connected to a negative reference voltage, relay coil 830 is not energized causing relay coil contacts 750a, shown schematically in FIGURE 6 of the drawings, to remain in their normally closed position for a purpose to be more fully described.

Assuming now that the input signals appearing at terminals 801 and 802 are reversed, that is, that a binary ONE is impressed upon terminal 802 and a binary ZERO is impressed upon a terminal 801, the binary ZERO at the input terminal 807 of multi-vibrator 806 produces a binary ONE level at the output terminal 808 and a binary ZERO level at the output terminal 809. Output terminal 808 which is connected to AND gate 820 impresses a binary ONE at its associated input terminal. The binary ONE level appearing at terminal 802 is inverted to a binary ZERO level through inverter placing a binary ZERO level at the RESET input terminal 813. The binary ONE level at terminal 802 is also impressed upon logical AND gate 818. Noting now that binary ZERO levels are present at both input terminals 812 and 813 of flip-flop 811, the state of flip-flop 811 is determined by its previous condition and the presence of binary ZERO levels is immaterial as will become clear by considering that if flip-flop 811 is in its RESET state than a binary ZERO level will be present at the output terminal 815 and binary ONE level will be present at the output 814. The binary ONE at the output terminal 814 will be impressed upon AND gate 818 which will produce a binary ONE output level since there are two binary ONE input levels appearing simultaneously at its input terminals. Terminal 815 which has a binary ZERO level places this binary signal upon AND gate 820 which produces a binary ZERO level at the output of AND gate 820. However, the outputs of AND gates 818 and 820 which are impressed on OR gate 822 generate a binary ONE output from OR gate 822 sufficient to drive flip-flop 825 to the SET state by impressing the binary ONE level upon input terminal 826 thus placing a positive voltage level on relay coil 830, thereby energizing it.

Assuming, however, that the flip-flop 811 is in the SET state as opposed to the RESET state, this places a binary ZERO signal at output terminal 815 which is impressed upon AND gate 820 causing that gate to produce a binary ZERO level at its output. However, terminal 814 of flip-flop 811 produces a binary ONE level signal which is impressed upon AND gate 818 and which combines with the binary ONE signal from input terminal 802 causing AND gate 818 to generate a binary ONE level, which is passed through OR gate 822 generating a binary ONE level for setting flip-flop 825. It can be seen that the state of flip-flop 811 is immaterial, in causing flip-flop 825 to be driven to the SET state.

Assuming now that both input signals at terminals 801 and 802 are binary ONES, the binary ONE at terminal 801 SETS multi-vibrator 806 causing output terminal 809 to generate a binary ONE level signal to drive flip-flop 811 to the SET state placing a binary ZERO at the output terminal 912 and a binary ONE at output terminal 815. The binary ZERO level from terminal 814 is impressed on AND gate 818 which combines with the binary ONE present at terminal 802 causing AND gate 818 to generate a ZERO binary level at its output. The multi-vibrator 806 having been driven to the SET state generates a binary ZERO level at its output terminal 808 which is impressed upon one input terminal of AND gate 820, which combines with the binary ONE level from output terminal 815 of flip-flop 811 to generate a binary ZERO signal at the AND gate 820 output terminal. Thus, two binary signals being impressed upon the input of OR gate 822 fail to generate a set pulse for setting flip-flop 825. The presence of binary ZEROS at input terminals 801 and 802 act in the same manner as binary ONE signals at terminals 801 and 802 so as to fail to generate a set pulse for flip-flop 825 causing the flip-flop to remain in the reset state, thereby maintaining relay coil 830 in the de-energized state. The relay coil 830 controls its normally closed contact 75 shown in FIGURE 6 so as to open these contacts when energized for the purpose of removing voltage from the interlock circuit rotary stack 140 which causes the entire comparison check operation to be repeated in a manner to be more fully described.

*Comparison circuit alternative embodiments*

An alternative arrangement for error check system 800 shown in FIGURE 9a is set forth in FIGURE 9b wherein error check circuit 850 is comprised of logical gates 853, 854, 857, and 859 for the purpose of recognizing the presence of an error in a manner similar to that performed by error check circuit 800. The operation of error circuit 850 is as follows:

Terminals 851 and 852 are provided for receiving the data from the encoders 27 of FIGURE 2 and from the central location 101 of of FIGURE 1 respectively. Assuming that the data received upon terminals 851 and 852 are each binary ONE signals, these binary ONE signals are impressed upon the input of OR gate 835 which generates a binary ONE at its output terminal. Inverter 856 inverts this binary ONE signal and impresses a binary ZERO upon the input terminal of OR gate 857. Simultaneously therewith the binary ONES present at terminals 851 and 852 cause AND gate 854 to generate a binary ONE which is impressed upon a terminal of OR gate 857 via emitter follower 855. The binary ONE signals presented upon the inputs of OR gate 857 generate a binary ONE output signal which is passed through emitter follower 858 to inverter 859 which responsive to the binary ONE input develops a binary ZERO output level at terminals 860 insufficient to drive the relay coil 830.

Assuming that binary ZEROS are present concurrently at terminals 851 and 852 OR gate 835 generates a binary ZERO as does AND gate 854. Inverter 856 inverts the binary ZERO level from OR gate 835 to impress a binary ONE level upon OR gate 857. While AND gate 854 impresses a binary ZERO on the input terminal of OR gate 857, the binary ONE impressed upon OR gate 857 from inverter 856, however, causes the OR gate to generate a binary ONE at its output terminal which causes inverter 859 to produce a binary ZERO level at its output 860 again failing to energize relay coil 830. Thus it can be seen that favorable comparisons fail to energize relay 830 be they binary ZEROS or binary ONES.

Upon the occurrence of a binary ZERO at terminal 851 and a binary ONE at terminal 852 and gate 854 generates a binary ZERO at its output depressing a binary ZERO upon the input terminal of OR gate 835 passes the binary ONE signal therethrough which inverter 856 inverts to a binary ZERO signal. The simultaneous presence of binary ZEROS upon OR gate 857 causes the OR gate to generate a binary ZERO level at its output which is inverted by inverter 859 to a binary ONE level at its output terminals 860 causing relay coil 830 to become energized. It should be noted that the impression of a binary ZERO upon terminal 851 and a binary ONE upon terminal 852 will likewise cause relay coil 830 to become energized, so that any error is identified by the error check circuit in order to energize relay coil 830.

Still another embodiment of the error monitoring circuit is shown in FIGURE 9c wherein the data stored in the shaft angle encoders is received at input terminal 701 and the data which was re-transmitted from central location 101 is impressed upon input terminal 702. Since the logical elements employed in the comparison circuit of FIGURE 9c have already been adequately described in the description of FIGURES 9a and 9b, the only operation of the circuit of FIGURE 9c is given, which operation is as follows:

Assuming that binary ONES are present at input terminals 701 and 702, this voltage level causes one-shot multi-vibrator 706 to move from its stable state, causing output terminal 708 to move to the binary ZERO level and output terminal 709 to move to the binary ONE level. Output terminal 708 is connected to the input of inverter 710 which impresses a binary ONE level upon one input terminal and two input AND gate 716. The binary ONE level impressed upon input terminal 702 causes output terminal 713 of binary flip-flop 703 to move to the binary ZERO voltage level. Inverter 726 inverts this input voltage to the binary ONE voltage level and impresses this voltage level upon the other input of AND gate 716. It should be noted that the output terminal 709 of multi-vibrator 706 impresses a binary ONE level voltage upon input terminal 705 and flip-flop 703 but this occurs a predetermined time after the impression of the binary ONE level voltage at input terminal 702. This permits binary ONE level voltages to be present simultaneously at the input terminals of AND gate 716.

The output terminal of AND gate 716 due to the presence of two binary ONE level voltages at its input terminals generates a binary ONE level output voltage which is impressed upon inverter 717 which inverts this to a binary ZERO voltage which voltage level is impressed upon the input terminal 719 of binary flip-flop 718.

Binary flip-flop 718 is normally maintained in such a manner that its output terminal 727 is at the binary ZERO voltage level. With the introduction of a binary ZERO voltage level at its input terminal 719, no change takes place in flip-flop 718. This is also true when binary ZERO level voltages are present at input terminals 701 and 702.

Assuming, however, that a binary ZERO level voltage is present at input terminal 702 and a binary ONE level voltage is present at input terminal 701, flip-flop 703, which was reset by the output terminal 709 of multi-vibrator 706 during the comparison operation of the previous binary bit, has its output terminal 713 at the binary ONE level. Multi-vibrator 706 has its output terminal 708 at the binary ZERO level. By means of inverters 726, 710, a binary ZERO and a binary ONE level voltage respectively are impressed upon the input terminals of AND gate 716. This combination fails to generate a binary ONE level output signal at the output terminal of AND gate 716, causing inverter 717 to impress a binary ONE level voltage upon input terminal 719 of binary flip-flop 718.

This signal causes output terminal 727 to move to the binary ONE level which voltage level is inverted by inverter 722 which generates a binary ZERO voltage level at its output terminal. Thus, a voltage difference is impressed across the terminals of relay solenoid 750 which acts to operate the cooperating contacts (not shown) in order to control the next stage of the communication cycle. It should be understood that the impression of a binary ONE level voltage at input terminal 701 and a binary ZERO voltage level at input terminal 702 will cause energization of relay coil 750 in the same manner as that set forth immediately above.

*Data receiver—Central location*

The data receiver 110 at the central location 101 shown in FIGURE 1 is set forth in greater detail in FIGURE 11. The data receiver 900 of FIGURE 1 is comprised of a plurality of tone receivers 901 which receive the incoming data transmitted from a remote location, such as remote location 102a for example, which is shown in FIGURE 1. The output 901a from tone receivers 901 are impressed upon pulse separator circuit 902 which is more fully described in copending U.S. application Serial No. 241,917, which application was referred to previously. Since the pulse separator 902 is more fully described in the aforementioned application, suffice it to say, for the purpose of understanding the data receiver 900, that the pulse separator 902 is adapted to separate data pulses from sync (i.e. synchronizing) pulses which have been combined at the remote location. Upon reception of the first or start pulse by pulse separator 902, terminal 902a generates a pulse which is transmitted to the remote location to acknowledge the fact that a message is being received. The sync pulses are transmitted from pulse separator 902 by means of output 905 for the purpose of shifting data through shift register 903. The data pulses from pulse separator 902 are impressed upon the shift register 903 by output 904. Shift register 903 operates in such a manner as to store the binary information received from output terminal 904 and to shift this information into the register 903 until an entire binary word is contained therein. This instant of time the word contained in shift register 903 undergoes a security check in circuitry 908 which is adapted to form a plurality of levels of security checks upon the data in shift register 903 in order to determine its validity.

The security check circuitry 908 is further adapted to generate a validating signal at its output terminal 911 which serves the dual purpose of generating a response to the remote location that the data received has passed the security check imposed upon it and also impresses a signal upon intermediate memory 813 which serves to transfer the binary coded word contained therein to the permanent memory 915 through the output leads 914. Intermediate memory 913 receives at its input terminals 912 the binary data which has been shifted into shift register 903, and which data is available at the shift register output terminals 907. If the security check circuitry 908 generates an error signal at its output terminal 911, the data transferred from the shift register 903 to memory 913 is prevented from entering permanent memory 915.

Permanent memory 915 which may, for example, be a paper tape punch which is adapted to produce a Baudot representation of the binary information impressed upon its input terminals. The perforated tape is available for use by data read-back device 111 which may, for example, be a paper tape reader and transmitter for generating the binary code representation and transmitting the coded information to the remote location via output lead 118, for the purpose of performing the comparison check as was previously described.

*System operation*

The operation of the communications network adapted for use as a central credit check system for ascertaining the credit rating of the customer at the specific remote location is as follows (the operation set forth is for only one remote location since all other remote locations communicate in an analogous fashion).

The operator or salesman at the specified remote location, such as remote location 102a at FIGURE 1, initiates the operation of equipment by setting up the 24 alpha-numeric characters of information on the imprinter by appropriately positioning the knurled knobs 27a (see FIGURE 2a) which align the shaft angle encoders 43 in order to set up the binary coded representation of the 24 alpha-numeric characters to be transmitted. After setting up the data in the shaft angle encoders, a blank sales slip 39 is inserted into imprinter 106 by means of slot 17 provided at the rear of housing 12. The portable printing plate 16 is inserted into the slot 13 of the imprinter 106, which plate engages limit switch 29. Limit switch 29, which is represented schematically by numeral 501 in FIGURE 3 of the drawings, provides the functions of locking the positioning of shaft angle encoders 43 during the communications cycle so that they may not be tampered with during this period and further acts to initiate the communications cycle.

The interlock circuit 108 of FIGURE 6, upon the closure of limit switch 501 establishes a current path from energy source 483 through limit switch 501, contact 412–0, arm 411, normally closed contacts 484a, and relay coil 481 to ground potential 482. The energization of relay coil 481 causes normally open contacts 481a to move to the closed position establishing a current path from energy source 483 through contacts 481a, resistor 494, dial 493 and the parallel circuit consisting of rotary switch stepping coil 491 and capacitor 492 to ground potential 482. Capacitor 492 is employed to prevent arching across contacts 481a. Dial 493 is provided to prevent any reverse current flow which may occur due to a charge build-up across capacitor 492. The closure of contacts 481a under control of relay coil 481 energizes relay coil 491 which is magnetically linked by means (not shown) to the common shaft 490 for the purpose of rotating all rotary arms 411 through 471 in the clockwise direction as shown by arrow 480.

Each arm 411 through 471 is moved from the ZERO or HOME position towards the ONE position. The energization of relay coil 481 simultaneously causes normally open contacts 481b to move the closed position, thus establishing a current path from ground potential 482 to relay coil 481, contacts 481b and interrupter contacts 488 to energy source 483 thus locking relay 481 in the energized state. Thus, the rotation of common shaft 490 which causes rotary arm 411 to disengage itself from contact 412–0 does not de-energize relay coil 481.

The interrupter contacts 488, however, are adapted (by means not shown) so as to separate when rotary arm 411 moves into an engaged position with contact 412–1, thus de-energizing relay coil 481, causing contacts 481a to return to their normally open state. This also de-energizes stepping switch coil 491 preventing rotary arm 411 from moving beyond its position of engagement with contact 412–1. It should be noted that rotary arms 421 through 471, while engaging their associated contacts 422–0 through 472–0 respectively, play no active part in this stage of the communication cycle.

*All rotary arms in engagement with contacts 412–1—472–1*

Rotary switch deck 410 at this time sets up a current path which consists of ground potential 482, relay coil 481 normally closed contacts 484a, rotary arm 411, contact 412–1 which is connected to one side of normally open contact pair 650b by conductor 495 and energy source 483 which is connected to the opposite terminal of normally open contact 650b. At this time contact pair 650b remains in its normally open state in readiness for closure by the tone receiver of FIGURE 7 as will be more fully described.

Contact 422–1 of rotary switch deck 420 serves no function in this state of the communication cycle.

Rotary switch deck 430 has its rotary arm 431 connected to negative potential source 520a via conductor 520b establishing a current path from energy source 520a, through conductor 520b, arm 431, contact 432–1 to tap 316h of inductor 303 in the tone transmitter 300 shown in FIGURE 5b. This places that portion of inductor 316 in parallel with the capacitors 304 and 305 of the tone transmitter circuitry, thus setting up a predetermined frequency to be transmitted by the tone transmitter 300.

Rotary deck 440 sets up a current path from output conductor 78 of dialer 107 shown in FIGURE 4 to contact 442–1; rotary arm 441, conductor 443, to input terminal 311 of tone transmitter 300 shown in FIGURE 5b. Thus, tone transmitter 300 is placed in readiness for transmission of a specified tone and is connected to dialer 107 for reception of the pulse train shown in FIGURE 4a, which pulse train represents the telephone call code of the central location 101.

Rotary switch deck 450 plays no part in the operation at this stage, since contact 452–1 is not connected in the interlock circuitry.

Arm 461 of rotary switch deck 460 which is in engagement with contact 460–1 establishes a current path from energy source 483 through normally closed contact 484e, conductor 485, arm 461, contact 462–1, limit-switch contacts 501a to relay coil 60 of dialer 107 shown in FIGURE 4 of the drawings. It should be noted that limit-switch 501a was moved to the closed position upon insertion of the portable printing plate 16 into the imprinter 106 of FIGURE 2 as previously described. The energization of relay coil 60 closes the normally open contact 60a of dialer 107, thus energizing motor 57 for initiation of the dialer 107 as was previously described.

The dialer 107, shown in FIGURE 4, which is wired by conductor 81 so as to produce the waveform 90 shown in FIGURE 4a, impresses this waveform upon the input terminal 311 of tone transmitter 300 (see FIGURE 5b). The impression of the positive voltage level upon the input terminal 311 of tone transmitter 300 causes transistor 301 to be driven beyond cutoff preventing conduction thereof. Upon removal of the positive voltage level or upon impression of ZERO voltage, reference transistor 301 is driven into conduction, thus generating a tone of the frequency determined by the values of capacitors 304, 305, and the portion of inductor 303 from tap 317h to collector terminal 302 which is connected in the tuned circuit, thereby generating a frequency at the tone transmitter load 307 which is coupled to the primary side 312a of the tone-generator-to-telephone-line-coupling-transformer 312.

Arm 471 of rotary switch deck 470 engages contact 472–1 establishing a current path from terminal 320 of tone transmitter 300, rotary arm 471, contact 472–1 and conductor 473 to terminal 321 of tone transmitter 300. This completes the current path between tone transmitter 300 and the telephone line 318a and 319 which is directly connected to the telephone automatic exchange equipment 104 shown in FIGURE 1 of the drawings. Thus, the secondary side 312b of coupling transformer 312 couples the output of tone transmitter 300 to the telephone automatic exchange equipment in order to place the call letter code or telephone number of the central location upon the remote location subscriber line.

The telephone automatic exchange equipment 104 interprets the phone number placed upon the subscriber line and automatically couples the remote location 102a with the central location 101. Assuming that the central location 101 does not have all of its lines tied up, the establishment of the telephone loop is acknowledged by the central location 101 which transmits a tone of a specified frequency through the loop established between central and remote locations, which tone is received by tone receiver 600 shown in FIGURE 7 of the drawings.

The receipt of the tone which denotes establishment of the message loop between remote and central locations causes tone receiver 600 to generate a square pulse, such as that shown in FIGURE 8, which is of sufficient pulse duration to energize tone receiver relay coil 650 to a potential sufficient to close normally open contacts 650b, thus establishing a current path from potential source 483, contact 650b, conductor 495, contact 412–1, arm 411, normally closed contacts 484a and relay coil 481 to ground potential 482. The energization of relay coil 481 operates contacts 481a to the closed position to energize rotary stepping coil 491 so as to operate common shaft 490 to rotate arms 411 through 471 in the same manner as previously described.

If, however, a message loop is not established, the dialer operation will be repeated in a continuous manner until reception at the remote location 102a of the tone representing acknowledgment of the establishment of the message loop.

*Rotary arms 411 to 471 in contact position 412–a to 472–2*

With the rotation of arm 411 to the position wherein it engages contact 412–2, a potential current path is set up which is comprised of ground potential 482, relay coil 481, normally closed contacts 484a, arm 411, contact 412–2, normally closed contact pair 496a, and normally open contact pair 650b to potential source 483. The operation of this current path will be more fully described.

Rotary switch deck 420 plays no part in this stage of the cycle.

Rotary switch deck 430 establishes a current path from negative energy source 520a, conductor 520b, arm 431, contact 432–2, and conductor 509 to arcuate segment 204 in track b of sequencer 200, shown in FIGURE 5a of the drawings.

Rotary switch deck 440 establishes a current path from input terminal 311 of tone transmitter 300 shown in FIGURE 5b through conductor 443 to rotary arm 441 contact 442–2, to contact 452–2 in rotary switch deck 450. Rotary arm 451 being in contact with terminal 452–2 connects this contact through rotary arm 451 and conductor 453 to track e of sequencer 200 shown in FIGURE 5a.

Deck 470 continues to maintain a current path across terminals 320 and 321 to establish connection between the tone transmitter 300 and the telephone line 318a and 319 shown in FIGURE 5b.

The energization of relay coil 355 closes normally open contacts of 355a of transmitter control circuit 350 establishing a current path from energy source 360, through fuse 361, contacts 355a and motor 351 to ground potential 354, thus initiating rotation of the rotary arm 206 of sequencer 200 shown in FIGURE 5a. The parallel branch consisting of resistor 359 and relay 356 becomes energized upon closure of contacts 355a causing the normally-open contacts 356a of relay 356 to move to the closed position locking motor 351 in the energized condition.

The energization of motor 351 drives rotary arm 206 into clockwise rotation as shown by arrow 240. As the arm 206 moves in a clockwise direction and comes into angular alignment with conductive segments 213 and 214, a current path is established from the positive D.C. source through conductor segment 213, sensing member 207 of rotary arm 206, conductor 216, sensing member 211, arcuate segment 205, conductor 453 of the imprinter 108 (see FIGURE 2), rotary arm 451 of rotary deck 450 (see FIGURE 6), contact 452–2, to contact 442–2 of rotary deck 440, rotary arm 441, and conductor 443 to input terminal 311 of tone transmitter 300 shown in FIGURE 5b of the drawings.

At the same instant of time a current path exists from the negative D.C. source 520, a through conductor 520b, rotary arm 431 of deck 430, contact 432–2, to track e (arcuate segment 204) of sequencer 200 shown in FIGURE 5a, sensing member 210 of rotary arm 206, conductor 217, sensing member 208, to conductive segment 214, which is electrically connected to tap 316g of conductor 303 in transmitter 300. Thus, transistor 301 is driven into conductive state so as to oscillate at a frequency determined by the values of capacitors 304 and 305 and that portion of inductor 303 from tap g to the collector terminal 302 of transistor 301. This tone is recognized by the data receiver 110 shown in FIGURE 1 of the drawings as a start of data transmission.

As the rotary arm 206 continues its clockwise rotation, sensing member 207 makes sequential contact with the conductive segment of the sequencer 200. It should be noted at this time that positive potential source 520, shown in FIGURE 3 of the drawings, is connected through normally closed contacts 230b to the common terminals of the group I shaft angle encoders 27 by means of bus 530 as shown in FIGURE 3. The output terminals of the encoders 27 are connected to the conductive segments 201 in track a of the sequencer 200. A detailed description of the shaft angle encoders is set forth in the aforementioned U.S. application, Serial No. 125,247, now U.S. Patent No. 3,165,733. It is sufficient, however for present purposes to understand that the binary coded representation which the shaft angle encoders 27 generate, consists of binary ONES which are represented by a positive voltage level and binary ZEROS which are represented by a zero voltage level (or by no voltage) being transmitted through the shaft angle encoder. Thus, upon the occurrence of a binary ONE at the left-handmost output terminal 45' of the left-hand-most shaft angle encoder 27' shown in FIGURE 3 of the drawings, a current path at this time is comprised of positive D.C. source 520 (see FIGURE 3) normally-closed contacts 230b, bus conductor 530, to the common terminal of shaft angle encoder 27', output terminal 45', to the first conductive segment 201' in track a of sequencer 200 (see FIGURE 5a) sensing member 207 of rotary arm 206, conductor 216, sensing member 211, arcuate conductive segment 205 in track *e* of sequencer 200, to rotary arm 451 in deck 450 (see FIGURE 6), contact 452-2, contact 442-2 of deck 440, rotary arm 441, conductor 43 to input terminal 311 of tone generator 300 shown in FIGURE 5*b*. The impression of the negative voltage upon input terminal 311 of tone generator 300 causes a tone burst of a predetermined frequency to be transmitted through coupling transformer 312 and the telephone lines 318*a* and 319 to the central location 101 shown in FIGURE 1 of the drawings. A binary ZERO is transmitted in much the same manner as a binary ONE with the exception that no negative voltage is impressed upon keying input 311 of tone transmitter 300 so that no tone burst is transmitted through the telephone line 318*a* and 319. Thus the central location interprets a tone burst on a binary ONE and the absence of a tone burst as a binary ZERO.

Rotary arm 206 upon the completion of one revolution, comes into angular alignment with conductive segments 227 and 228 establishing a current path from ground potential 229, conductive segment 227, sensing member 210 of rotary arm 206, conductor 217, sensing member 208, conductive segment 228, normally-closed contacts 230*a*, and relay coil 231 to energy source 232. The energization of relay coil 231 causes the closure of normally open contacts 231*a*, shown in FIGURE 5*a*, for cooperation with rotary arm 206 at the end of the second revolution for a purpose to be more fully described.

Relay coil 231 also operates normally-closed contacts 230*b* shown in FIGURES 3 and 6 of the drawings to the open position and causes normally open contact 230*c* to be moved to the closed position, thus disengaging the encoders 27 which are in the first group of characters to be transmitted and couples the shaft angle encoders 27 which are in the second group (group II) of characters to be transmitted to the positive D.C. source 520 through the now closed contact pair 230*c*. The shaft angle encoders 27 which comprise group II have their output terminals each connected to an associated conductive segment 203, in track *c* of the sequencer 200. Thus, upon initiation of the second revolution by rotary arm 206, none of the conductive segments 201 in track *a* receive energy from the shaft angle encoders of group I but the conductive segments 203 receive energization from the group II shaft angle encoders 27, the binary coded data of which is transmitted from the segments 203 through sensing member 209 of rotary arm 206, conductor 216, sensing member 211, arcuate segment 205 in track *e* and through the connections provided in rotary switch decks 450 and 440 (of FIGURE 6) as previously described, to the input terminal 311 of tone transmitter 300.

At the completion of the data transmission and just prior to the completion of the second revolution, rotary arm 206 comes into angular alignment with conductive segments 225 and 226 in tracks *c* and *d* respectively establishing a current path from ground potential 229 through conductive segment 225, sensing member 210 of rotary arm 206, conductor 217, sensing member 208, conductive member 226, and contacts 231*a* and relay coil 230, to energy source 232. Contacts 231*a* which were operated to the closed position by relay coil 231 and are the slow-to-open type which, once engaged, remain engaged for a period of sufficient length so as to remain closed sufficiently long for completion of this current path. Energization of relay coil 230 opens normally closed contacts 230*a* to prevent rotary arm 206 from establishing a current path when it leaves contacts 225-226 and comes into alignment with conductive segments 227 and 228.

Relay coil 496 (see FIGURE 6) is contained in a current path which is comprised of ground potential 482, capacitor 496*b* which is in parallel with relay coil 496, diode 527, resistor 526 and normally-closed contact 231*b* to energy source 483. The energization of relay 496 maintains contacts 496*a* in the disengaged or open position, thus maintaining relay coil 481 in the deenergized state.

The energization of relay 231 of FIGURE 5*a*, however, moves normally-closed contacts 231*b* to the disengaged position, thereby deenergizing relay 496 (which operation occurs at the middle of the data transmission cycle). The contacts 496*a* of relay coil 496 are of the slow-to-close type so that closure of these contacts does not occur until after completion of the second revolution of rotary arm 206 in order to guarantee a sufficient time period for the transmission of all of the binary coded data from remote location to central location.

The movement of contacts 496*a* to their normally closed position establishes a current path from energy source 483, contacts 650*b*, through now closed contacts 496*a*, to contact 412-2 of rotary deck 410, rotary arm 411, normally closed contacts 484*a* and relay coil 481 to ground potential 482. As previously described, relay 481 closes normally open contact pairs 481*a* and 481*b* which act to energize rotary switch stepping coil 491 and to lock in relay coil 481, respectively. Relay coil 491 controls the rotation of common shaft 490, stepping the rotary arms 411 through 471 to the next contact position. Interrupter contacts 488 interrupt upon movement of the rotary arms 411 to 471 to the next contact position, thus preventing further rotation of common shaft 490 and hence, rotary arms 411 through 471.

*Rotary arms 411–471 in contact position 2*

In this position rotary decks 410 and 420 cooperate to establish a current path from ground potential 482 through relay coil 481, normally closed contacts 484*a*, rotary 411, contact 412-3 to conductor 503, normally-open contacts 504*a* of relay solenoid 504, conductor 508, contact 422-3 of rotary switch deck 420, rotary arm 421 and conductor 421*a* to energy source 483. Contacts 504*a*, being of the normally-open type, prevent the establishment at this instant of a closed current path therethrough. The operation of these contacts 504*a* will be more fully described.

The transmission of the binary coded data to the central location 101 shown in FIGURE 1 of the drawings is received by the data transmitters shown in FIGURES 1 and 10 of the drawings. The binary coded data, upon receipt by the central location data receiver 110, converts the serially transmitted data into parallel bits by means of shift register 903 and then transfers each binary coded character in parallel by means of leads 907 to intermediate memory 913. Upon successful completion of security checks by security check circuitry 908, the data is transferred from intermediate memory 913 into permanent memory 915 which may be, for example, a tape punch unit. This data is transferred through data readback circuit 111 to the computer 112 which uses the customer's card identification number to locate his account in the vast memory system of the computer. The present status of the customer's account is then compared against the total amount of the purchase the customer wishes to make in order to ascertain whether approval of the credit purchase should be given. An additional bit of information may also accompany the customer's account which is information of the form that the credit card formerly held by that customer has been reported as being lost or stolen. Thus the computer 112 produces three possible responses to the credit check which it performs, namely, an approval of the purchase; a disapproval of the intended purchase; or a signal apprising a remote location of the fact that that particular credit card has been reported by its owner as being lost or stolen. This signal is transferred from the credit check computer 112 to the conductor 120 (see FIGURE 1) to the data receiver 110 which generates one of the three waveforms 950, 960, or 970 shown in FIGURE 12 of the drawings, which waveforms represent the approval, the disapproval and the stolen or lost signals, respectively.

The approval signal consists of a continuous burst of a predetermined frequency which is ultimately impressed upon relay coil 504 which is contained in the current path comprised of ground potential 428, relay coil 504 (which is in parallel with glow lamp 505), conductor 508, contact 422–3 of rotary switch deck 420, rotary arm 421, conductor 421a to normally-open contacts 650b through conductor 495, the opposite terminal of which is connected to energy source 483. Normally open contacts 650b are controlled by tone receiver relay coil 650 of the tone receiver circuit 600 shown in FIGURE 7. The tone receiver 650 receives the waveform 950 and converts it to a pulse having a pulse width which is equal in length to the length of tone bursts of the waveform 950 shown in FIGURE 12. This pulse causes the closure of normally-open contacts 650b causing the energization of timing relay coil 504 and lamp 505 after a predetermined time. Relay timing coil 504 closes its normally-open contacts 504a to establish a current path therethrough, as was previously described, to cause the closure of normally-open contacts 504a. Glow lamp 505 glows continuously thereby apprising the operator of the remote location of the fact that the credit transaction has been approved by the central location and simultaneously therewith the closure of contacts 504a causes the rotary arms 411 through 471 to be stepped to the next contact position.

Upon the transmission of a disapproval signal 960 of FIGURE 12, it can be seen that short tone bursts are transmitted to tone receiver 600 causing tone receiver 600 to generate square pulses each having pulse widths equal in time to the time duration of tone burst 961 of the wave pattern 960 transmitted by the central location. The time periods 961 of the tone burst in the wave pattern 960 shown in FIGURE 12 are of a time period which is insufficient to cause the closure of normally-open contacts 504a so that the interlock circuit 108 will not step to the next cycle of the operation. However, at this time the tone bursts 961 of wave pattern 960 are of sufficient length to cause the closure of normally-open contact 650b for the purpose of causing glow lamp 505 to operate in a blinking fashion. Relay coil 504 as previously described, however, is not energized for a sufficient period to cause the closure of its normally-open contact pair 504a. The blinking lamp 505 apprises the remote location operator of the fact that the purchase which the customer desires to make has been disapproved by the central location.

Upon the generation of wave pattern 970 which is interpreted as a signal apprising the remote location that the credit card has been reported lost or stolen, the receipt of this waveform causes the tone receiver 600 to operate in the same manner as it does upon receipt of the wave pattern 960 with the exception that the tone bursts 971 of the wave pattern 970 are shorter in duration than the tone bursts 961 of the wave pattern 960. Also the elapsed time 972 between adjacent tone bursts 971 is less than the elapsed time 962 between adjacent tone bursts 961 of the wave pattern 960, causing glow lamp 505 to be modulated (i.e., to blink) at a more rapid rate. The tone hursts 971 of the wave pattern 970 are still of insufficient time duration to cause the closure of normally-open contact 504a so that the interlock circuit 108 will not be stepped to the next stage of the program.

Upon receipt of either a disapproval signal 960 or a stolen or lost card report signal 970, which waveforms are shown in FIGURE 12, the blinking or flashing of of glow lamp 505 apprises the operator at the remote location that the transaction cannot proceed beyond this point. At this time the operator depresses the cancel push button 484 so that contact pair 484a of the cancel push button 484 prevents energization of relay coil 481 through any path containing rotary arm 411. Contact pair 484b of the cancel push button 484 moves to a closed position upon depression of the cancel push button 484 to complete a current path consisting of off-normal contacts 487, normally-open contact pair 486, contact pair 484b and relay coil 481 to ground potential 482. The energization of relay coil 481 as previously described closes contact pair 481a energizing the rotary stepping switch relay 491. Contact pair 491a, which is in the current path set forth above, is operated to the open position by rotary stepping switch coil 491. As the stepping switch coil 491 steps common shaft 490 one position at a time in the clockwise direction shown by arrow 480, at the end of each step normally-closed contacts 491a return to their normally-closed position causing reenergization of relay coil 491 and another advancement of rotary stepping switch 108. Off-normal contact pair 487 is mechanically linked with the common shaft 490 so as to be moved to the disengaged position upon return of the rotary arm 411 to the home or ZERO contact position at which position rotary arm 411 engages contact 412–0 placing the interlock circuit 108 in readiness for the next communications cycle.

At the instant that cancel push button 484 is depressed, cancel push button contact pair 484c moves from the normally-open position to the closed position establishing a current path at rotary deck 430 from negative energy source 520a, conductor 520b, arm 431, contact 432–3, conductor 510, contact pair 484c to tap 316c of tone transmitter 300 shown in FIGURE 5b. This changes the tuned frequence of the tone circuit comprised of conductor 303 in capacitor 304 and 304 in readiness for transmission of a tone burst to the central location.

Simultaneously therewith, normally-open cancel push button contact pair 484d is moved to the closed position establishing a current path from positive energy source 520 through contact pair 484d, contact 442–3, rotary arm 441, and conductor 443 to the input terminal 311 of tone transmitter 300. The impression of the voltage source upon input terminal 311 of the tone transmitter 300 drives transistor 301 into a state of saturation causing the transmission of a tone burst, the frequency of which is determined by the inductance value to tap 316c connected into the circuit by means of rotary deck 430. Rotary deck 470 continues to short out terminals 320 and 321 of tone transmitter 300 in order to permit transmission of this tone burst to the central location. Rotary decks 450 and 460 play no part in this stage of the communications cycle.

Receipt of this predetermined frequency at the central location 101 shown in FIGURE 1 apprises the central location of the termination of the credit purchase at the remote location 102a so that no new entry will be made in the credit check computer 112 since either no purchase approval has been given by remote location 102a or since the customer has changed his mind about the purchase.

Assuming that the approval signal 950 of FIGURE 12 is transmitted to the central location 101 to remote location 102a, the current path containing timing relay coil 504 energizes relay coil 504 for a sufficient period to close normally-open contacts 504a, thereby establishing a current path from energy source 483, contact pair 650b, conductor 421a, rotary arm 421 of deck 420, contact 422–3, conductor 508, contact pair 504a, contact 412–3 of deck 410, arm 411, contact pair 484a and relay coil 481 to ground potential 482, thus advancing the position of the rotary arms 411 through 471 for engagement with the associated contacts 412–4 to 472–4 in readiness for the next stage of the communications cycle.

*Rotary arms in contact position 4*

Rotary deck 410 sets up a potential current path which is comprised of ground potential 482, relay coil 481, contact pair 484a arm 411, contact 412–4 conductor 506 and normally-closed contact pairs 750a and 496b to potential source 483. It should be noted that the contact pairs 750a and 496b are moved to their open position at this time to prevent current flow therethrough in a manner to be more fully described.

Rotary switch deck 420 plays no part in this stage of the cycle.

Rotary switch deck 430 establishes a current path from negative voltage source 520a, conductor 520b, arm 431, contact 432–4 to arcuate segment 204 in track d of sequencer 200 shown in FIGURE 5a.

Rotary switch deck 440 establishes a current path from positive energy source 520, contact 442–4, arm 441 and conductor 443 to tone transmitter 300. The impression of a positive energy source upon the tone transmitter drives transistor 301 into the cut-off state preventing transmission from remote location 102a to central location 101 shown in FIGURE 1.

Rotary switch deck 450 establishes a current path between arcuate conductive segment 205 (in track e of sequencer 200 shown in FIGURE 5a), conductor 453, rotary arm 451, contact 452–4, to input terminal 801 of error check circuit 800 shown in FIGURE 9. A tone receiver is provided at the remote location for receiving the encoded binary data which was transmitted to the central location which tone receiver impresses its output upon terminal 802 of error check circuit 800 placing the error check circuit in readiness for performing a comparison of the data stored at the remote location with the data that has been transmitted to the central location.

Rotary deck 460 establishes a current path from energy source 483, contact pair 484e, conductor 485, arm 461, contact 462–4, contact pair 496c, to terminal 362 of realy 355, the opposite terminal of which is at ground potential 354. The energization of relay 355 sets off the operation of sequencer 200 shown in FIGURE 5a which operates in the same manner as previously described to impress the binary coded data upon the input terminal 801 of error comparison circuit 800 in a serial fashion so as to be compared against the data received from the central location 101. It should be noted that contact pair 496c will be in its engaged position due to the energization of relay coil 496, which it can be seen is in the current path between energy source 483 and ground potential 482 as shown in FIGURE 6 of the drawings.

Rotary switch deck 470 maintains electrical continuity across terminals 320 and 321 of telephone line 318 in order to permit receipt of the binary coded data from the central location by the remote location. The input tone receiver (FIGURE 7) is coupled to telephone lines 318a and 319 by coupling transformer 322 which has its primary side 322a connected to the telephone lines and its secondary side 322b connected to the input of the tone receiver (FIGURE 7). The data is compared in error check circuit 800 in a bit-by-bit fashion as was previously described. Throughout the operation of error check circuit 800 the output relay coil 830 remains in the de-energized state when the data comparison is favorable. Relay coil 830 does not become energized until the occurrence of an error in the manner which was previously described. Thus, the contacts 830a of relay 830 shown in FIGURE 6 remains in their normally-closed position.

Contacts 496b, however, which are under control of relay 496, remain in the open position until the de-energization of relay coil 496 occurs. Relay coil 496 is de-energized upon the energization of relay coil 231 of sequencer 200 which energization causes normally-closed contacts 231b to move to the disengaged position, thus de-energizing relay coil 496 causing contacts 496b to move to the closed position. It should be noted that, as was previously described, the contacts 496b are of the slow-to-close type so that their closure does not occur until the completion of the comparison operation of error check circuit 800.

Upon successful completion of the error check by comparison circuitry 800, contacts 496b return to their normally-closed state and, together with contacts 830a which remain in their closed state, a current path is established therethrough from energy source 483 for the purpose of energizing relay coil 481 to step the interlock circuit 108 to the next step in the program.

Upon the occurrence of an error in the comparison circuit 800, relay coil 830 becomes energized, moving contacts 830a to the open position. The energized state of the relay coil 830 is retained throughout the entire comparison operation even though a second error may occur, so that upon the termination of the comparison stage of the communications cycle the interlock circuit 108 is prevented from stepping to the next rotary switch contact position. This is interpreted by the central location as a request to retransmit the data which has been received from the remote location 102a in order to carry out a second comparison cycle, to insure the fact that the error is not the fault of the communications medium. If the second error check which is performed recognizes the same error, a third error check may be carried out and will occur automatically in the same manner as the second error check was carried out. If upon the performance of a plurality of such error checks, the error is still present, then the entire communication cycle may be reinitiated by first terminating the present communications link by means of depressing cancel push button 484. Cancel pushbutton contact pair 484a then steps the interlock circuit back to the home position, as was previously described, in readiness for the next communications cycle; cancel push button contact pair 484c couples a negative D.C. to track c of the data transmitter inductor 303 which, together with cancel push button contact pair 484d drives transistor 381 of oscillator 300 into a state of saturation causing the tone transmitter 300 to generate a tone which is interpreted by the central location as a termination of the communications cycle. Cancel push button contact pair 484e provides isolation between the energy source 483 and the circuitry associated with rotary deck 460 for a purpose to be more fully described.

Assuming that no error occurs in the comparison operation, the stepping of the interlock circuit 108 to the next program step causes the arms 411 through 471 to move into engagement with their associated contacts 412–5 through 472–5 respectively.

*Rotary arms in contact position 5*

Rotary switch decks 410, 420, and 450 play no part in this stage of the program cycle.

Rotary switch deck 470 maintains an electrical connection across terminals 320 and 320 of telephone line 318a as shown in FIGURE 5b.

Rotary switch deck 460 establishes a current path comprised of energy source 483, normally-closed cancel push button contact pair 484e, conductor 485, arm 461, contact 462–5 and release solenoid 525 to ground potential 482. Release solenoid 525, which is the schematic equivalent of solenoid 26 shown in FIGURE 2 of the drawings, becomes energized to rotate latching member 24 (see FIGURE 2) counterclockwise about its pivot point 29 to unlatch the printing roller assembly consisting of members 18 through 21, enabling the operator at the remote location to move print roller handle 19 in the direction shown by arrow 25 to appropriately print the sales slip for the instant transaction.

Upon movement of the print roller 18 to the end of its travel, the arm 20 of the print roller handle assembly abuts limit switch 30 shown in FIGURE 2 which is shown schematically by numeral 511 in FIGURE 6. This sets up a current path through rotary deck 430 which consists of negative voltage source 520a, conductor 520b, arm 431, contact 432–5, limit switch contacts 511 (which are now in the closed position) to tap 316a of inductor 303 in order to set up a predetermined frequency in tone transmitter 300 of FIGURE 5b. This predetermined tone frequency is recognized by central location 101 shown in FIGURE 1 as an acknowledgment of the completion of the transaction at the remote location 102a so as to enable the central location 101 to enter the amount of this transaction into the computer 112 for the purpose of maintaining the customer account current.

If for any reason the customer desires to change his mind about the making of the purchase, he may do so in spite of the fact that the central location has given approval of the intended purchase. This is done by the depression of cancel push button 484 which causes the stepping of the common arm 490 around to the home position in readiness for subsequent credit check communications cycles. For example, assuming the customer desired to terminate the purchase after the approval by the central location of the intended purchase and after the comparison cycle has taken place. The depression of cancel push button 484, in addition to stepping the rotary arms 411 through 471 to the home position, causes cancel push button contact pair 484e to move to the disengaged position, thus preventing the energization of release solenoid 525 so as to prevent the preparation and printing of a sales slip by the remote location. Cancel push button contact pairs 484c and 484d, as previously described, cause tone transmitter 300 to generate a predetermined frequency which is recognized by the central location as a cancellation of the intended purchase at the remote location 102a. The central location 101 will not enter this transaction into the credit check computer 112 when this tone is received.

Thus it can be seen that the communication system of this invention provides a fully automatic, high speed, credit check operation which is completely programmed throughout the entire communications cycle, causing the system to operate at high speeds and to be devoid of human error.

Although we have described preferred embodiments of our novel invention, many variations and modifications will now be obvious to those skilled in the art, and we prefer therefore to be limited not by the specific disclosure herein but only by the appended claims.

The embodiments of the invention in which an exclusive privilege or property is claimed are defined as follows:

1. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal.

2. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal.

3. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established.

4. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link.

5. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link, said communications link comprising a telephone network.

6. A communications system between a remote and a central location comprising, first means at said remote location for signaling said central location to establish a communications link, first receiver means at said central location for generating a signal ackowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said enclosed data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link, said communications link comprising a telephone network, said remote location and said central location being subscribers in said telephone network.

7. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communications link between said remote and said central locations until said communications link is established, manually operable cancellation means for deactivating said fourth means for terminating the attempt of said remote location to establish a communications link, said communications link comprising a telephone network, said remote location and said central location being subscribers in said telephone network, said first means comprising dialer means for electronically generating the call code for said central location, said fourth means being adapted to cause said dialer means to operate continuously until said communications link is established.

8. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link, said communications link comprising a telephone network, said remote location and said central location being subscribers in said telephone network, said first means comprising dialer means for electronically generating the call code for said central location, said fourth means being adapted to cause said dialer means to operate continuously until said communications link is established, said remote location transmitting means including sixth means for transmitting amplitude modulated tones location representing said encoded data to said central location; said sixth means being connected to said remote location first storage means.

9. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link, said communications link comprising a telephone network, said remote location and said central location being subscribers in said telephone network, said first means comprising dialer means for electronically generating the call code for said central location, said fourth means being adapted to cause said dialer means to operate continuously until said communications link is established, said remote location transmitting means including sixth means for transmitting amplitude modulated tones location representing said encoded data to said central location; said sixth means being connected to said remote location first storage means, said first storage means including manually settable rotary means, visual indicating means to produce a visual indication of the settable rotary means; each of the rotary means discrete settings representing an associated alpha-numeric character; shaft encoder means for generating a unique binary coded representation for each discrete setting of said rotary means.

10. A communications system between a remote and a central location comprising, first means at said remote location for signaling said central location to establish a communications link, first receiver means at said central location for generating a signal acknowledgment establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link, said communications link comprising a telephone network, said remote location and said central location being subscribers in said telephone network, said first means comprising dialer means for electronically generating the call code for said central location, said fourth means being adapted to cause said dialer means to operate continuously until said communications link is established, said remote location transmitting means including sixth means for transmitting amplitude modulated tones location representing said encoded data to said central location; said sixth means being connected to said remote location first storage means, said first storage means including manually settable rotary means, visual indicating means to produce a visual indication of the settable rotary means; each of the rotary means discrete settings representing an associated alpha-numeric character; shaft encoder means for generating a unique binary coded representation for each discrete setting of said rotary means, shaft encoder means having a plurality of output terminals for generating a parallel binary coded output; said transmitting means being adapted to transmit said parallel binary coded output in serial fashion.

11. A communications system between a remote and a central location comprising, first means at said remote location for signalling said central location to establish a communcations link, first receiver means at said central location for generating a signal acknowledgment establishment of said communication link; first data storage means at said remote location; second means at said remote location responsive to said acknowledgement signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communications link, said communications link comprising a telephone network, said remote location and said central location being subscribers in said telephone network, said first means comprising dialer means for electronically generating the call code for said central location, said fourth means being adapted to cause said dialer means to operate continuously until said communications link is established, said remote location transmitting means including sixth means for transmitting amplitude modulated tones location representing said encoded data to said central location; said sixth means being connected to said remote location first storage means, said first storage means including manually settable rotary means, visual indicating means to produce a visual indication of the settable rotary means; each of the rotary means discrete settings representing an associated alpha-numeric character; shaft encoder means for generating a unique binary coded reresentation for each discrete setting of said rotary means, shaft encoder means having a plurality of output terminals for generating a parallel binary coded output; said transmitting means being adapted to transmit said parallel binary coded output in serial fashion, said data receiver at said central location being adapted to transmit a signal acknowledging receipt of said encoded data.

12. A communications system between a remote and a central location comprising, first means at said remote location for signaling said central location to establish a communication link, first receiver means at said central location for generating a signal acknowledgement establishment of said communication link; first data storage means at said remote location; second means at said remote location responsive to said acknowledgment signal for transmitting the encoded data in said first data storage means to said central location through said communications link, recording means at said central location connected to said first receiver means for permanently recording said encoded data; data processing means for evaluating said encoded data stored in said recording means; said data processing means being adapted to generate a signal representative of the data evaluation; third means at said remote location responsive to said data processing means output signal for comparing the encoded data in said first data storage means with the encoded data received at said central location; said data comparison means being adapted to transmit a signal to said central location upon completion of the comparison operation, said data processing means being adapted to record said encoded data in response to said data comparison output signal; said first means at said remote location including fourth means for continuously attempting to establish a communication link between said remote and said central locations until said communications link is established, manually operable cancellation means for deactivating said fourth means for terminating the attempt of said remote location to establish a communication link, said communications link comprising a telephone network, said remote location and said central location being subscribers in said telephone network, said first means comprising dialer means for electronically generating the call code for said central location, said fourth means being adapted to cause said dialer means to operate continuously until said communications link is established, said remote location transmitting means including sixth means for transmitting amplitude modulated tones location representing said encoded data to said central location; said sixth means being connected to said remote location first storage means, said first storage means including manually settable rotary means, visual indicating means to produce a visual indication of the settable rotary means; each of the rotary means discrete settings representing an associated alphanumeric character; shaft encoder means for generating a unique binary coded representation for each discrete setting of said rotary means, shaft encoder means having a plurality of output terminals for generating a parallel binary coded output; said transmitting means being adapted to transmit said parallel binary coded output in serial fashion, said data receiver at said central location being adapted to transmit a signal acknowledging receipt of said encoded data.

References Cited by the Examiner
UNITED STATES PATENTS

| | | | |
|---|---|---|---|
| 2,906,998 | 9/1959 | Costa | 340—152 |
| 3,069,625 | 12/1962 | Masasuke Morita et al. | 325—349 |
| 3,082,402 | 3/1963 | Scantlin | 340—152 |
| 3,111,625 | 11/1963 | Crafts | 325—349 |

NEIL C. READ, *Primary Examiner.*

H. I. PITTS, *Assistant Examiner.*

UNITED STATES PATENT OFFICE
CERTIFICATE OF CORRECTION

Patent No. 3,308,238 March 7, 1967

Abraham Brothman et al.

It is hereby certified that error appears in the above numbered patent requiring correction and that the said Letters Patent should read as corrected below.

In the heading to the printed specification, lines 5 to 7, for "assignors to Transitel International Corporation, Paramus, N. J., a corporation of New Jersey" read -- assignors, by mesne assignments, to Sangamo Electric Company, Springfield, Ill., a corporation of Delaware --.

Signed and sealed this 28th day of November 1967.

(SEAL)

Attest:

Edward M. Fletcher, Jr.

Attesting Officer

EDWARD J. BRENNER

Commissioner of Patents